(12) United States Patent
Ito et al.

(10) Patent No.: US 12,330,649 B2
(45) Date of Patent: Jun. 17, 2025

(54) DECELERATION ASSISTANCE DEVICE, VEHICLE, DECELERATION ASSISTANCE METHOD, AND PROGRAM

(71) Applicant: TOYOTA JIDOSHA KABUSHIKI KAISHA, Toyota (JP)

(72) Inventors: Shogo Ito, Shizuoka-ken (JP); Yuta Ikezawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 18/082,929

(22) Filed: Dec. 16, 2022

(65) Prior Publication Data

US 2023/0219571 A1    Jul. 13, 2023

(30) Foreign Application Priority Data

Dec. 24, 2021    (JP) ................................. 2021-210299

(51) Int. Cl.
*B60W 30/18*  (2012.01)
*B60W 30/095*  (2012.01)
(Continued)

(52) U.S. Cl.
CPC .... *B60W 30/18109* (2013.01); *B60W 30/095* (2013.01); *B60W 30/18154* (2013.01);
(Continued)

(58) Field of Classification Search
CPC ............. B60W 30/095; B60W 30/181; B60W 30/18109; B60W 30/18154; B60W 40/105; B60W 2520/10; B60W 2520/105; B60W 2552/53; B60W 2554/80–806; B60W 2555/60; B60W 2720/106;
(Continued)

(56) References Cited

U.S. PATENT DOCUMENTS

| | | |
|---|---|---|
| 8,355,851 B2 | 1/2013 | Inoue et al. |
| 8,370,040 B2 | 2/2013 | Inoue et al. |

(Continued)

FOREIGN PATENT DOCUMENTS

| | | |
|---|---|---|
| JP | 2006-285731 A | 10/2006 |
| JP | 2011-143745 A | 7/2011 |

(Continued)

*Primary Examiner* — Mark L. Greene
(74) *Attorney, Agent, or Firm* — Sughrue Mion, PLLC

(57) ABSTRACT

A deceleration assistance device including: a target information acquisition unit for acquiring information of a target located in front of a vehicle; a position estimation unit for estimating an estimated position of a deceleration object; a position recognition unit for recognizing a position of the deceleration object; and a control unit for executing, based on the estimated position, first deceleration control of decelerating a vehicle at a first deceleration and executing, based on the recognized position, second deceleration control of decelerating the vehicle at a second deceleration. The control unit executes processing of gradually changing a deceleration of the vehicle from the first deceleration toward the second deceleration when the deceleration control is caused to transition from the first to the second deceleration control, and when a difference exists between the first and second deceleration.

14 Claims, 11 Drawing Sheets

(51) Int. Cl.
*B60W 40/105* (2012.01)
*G06V 20/56* (2022.01)
*G06V 20/58* (2022.01)

(52) U.S. Cl.
CPC ....... *B60W 40/105* (2013.01); *B60W 2552/53* (2020.02); *B60W 2554/80* (2020.02); *B60W 2555/60* (2020.02); *B60W 2720/106* (2013.01); *G06V 20/584* (2022.01); *G06V 20/588* (2022.01)

(58) Field of Classification Search
CPC ......... B60K 28/00–165; G05D 1/0061; G05D 1/0088; G05D 1/021; G05D 1/0214; G05D 1/0221; G05D 1/0223; G06V 20/584; G06V 20/588
See application file for complete search history.

(56) References Cited

U.S. PATENT DOCUMENTS

| | | |
|---|---|---|
| 8,417,430 B2 | 4/2013 | Saeki |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |
| 10,486,698 B2 | 11/2019 | Masui et al. |
| 10,654,463 B2* | 5/2020 | Adachi .................. B60W 10/18 |
| 2019/0295419 A1 | 9/2019 | Tosa et al. |
| 2021/0064894 A1 | 3/2021 | Ikezawa et al. |
| 2021/0261119 A1 | 8/2021 | Nakamura et al. |

FOREIGN PATENT DOCUMENTS

| | | |
|---|---|---|
| JP | 2012-148699 A | 8/2012 |
| JP | 2012-162208 A | 8/2012 |
| JP | 2021-033772 A | 3/2021 |
| JP | 2021-135523 A | 9/2021 |

* cited by examiner

DECELERATION ASSISTANCE DEVICE, VEHICLE, DECELERATION ASSISTANCE METHOD, AND PROGRAM

BACKGROUND OF THE INVENTION

1. Field of the Invention

The present disclosure relates to a deceleration assistance device, a vehicle, a deceleration assistance method, and a program.

2. Description of the Related Art

Hitherto, there has been known a device which executes, when a stop line of an intersection is detected in front of a traveling vehicle, and an intention of a right turn or a left turn of a driver is confirmed, deceleration control of automatically decelerating the vehicle to a target speed appropriate for the right turn or the left turn before the vehicle reaches the stop line (see, for example, Japanese Patent Application Laid-open No. 2011-143745).

The stop line of the intersection in front of the vehicle can be recognized by a camera mounted to the vehicle or the like. However, there is a limit to a distance at which the stop line can be recognized by the camera. Thus, when the deceleration control is started from the time when the camera recognizes the stop line, the deceleration control is started at a timing at which the vehicle is closer to the intersection than a position considered appropriate by a driver, and the driver may sense uncomfortable feeling.

In order to reduce such uncomfortable feeling sensed by the driver, it is considered to estimate a stop line position of the intersection before the camera recognizes the stop line, and start the deceleration control while setting the estimated stop line position as a target position. However, after the deceleration control is started based on the estimated stop line position, when the camera recognizes the stop line, and the target position is accordingly switched to a stop line position recognized by the camera, the deceleration of the vehicle is changed suddenly and greatly in a case in which there is a difference between the estimated stop line position and the recognized stop line position. When the deceleration of the vehicle changes suddenly, there is a problem in that a behavior of the vehicle changes greatly, and deterioration of drivability is thus induced.

SUMMARY OF THE INVENTION

The present disclosure has been devised in order to solve the above-mentioned problem. That is, one object of the present disclosure is to effectively prevent deterioration of drivability in deceleration control.

A device according to at least one embodiment of the present disclosure is a deceleration assistance device (1) for executing deceleration control of automatically decelerating a traveling vehicle (SV) based on a deceleration object in front of the vehicle (SV), the deceleration assistance device (1) including: a target information acquisition unit (30) configured to acquire target information relating to a target in front of the vehicle (SV); a position estimation unit (12) configured to estimate an estimated position (S1) of the deceleration object based on the target information relating to a target other than the deceleration object and being acquired by the target information acquisition unit (30) before the target information acquisition unit (30) acquires the deceleration object as the target information; a position recognition unit (14) configured to recognize, when the target information acquisition unit (30) acquires a position (S2) of the deceleration object as the target information, the acquired position as a recognized position (S2) of the deceleration object; and a control unit (15, 16, 17) configured to execute, based on the estimated position (S1), first deceleration control of decelerating the vehicle (SV) at one of a constant first deceleration (G1) or a variable first deceleration (G1), and to execute, based on the recognized position (S2), second deceleration control of decelerating the vehicle (SV) at one of a constant second deceleration (G2) or a variable second deceleration (G2). The control unit (15, 16, 17) is configured to execute gradual change processing of gradually changing a deceleration of the vehicle (SV) from the first deceleration (G1) toward the second deceleration (G2) when the deceleration control is caused to transition from the first deceleration control to the second deceleration control, and when a difference exists between the first deceleration (G1) and the second deceleration (G2). The control unit (15, 16, 17) may be configured to execute the gradual change processing at a change rate of the deceleration per unit time different from the change rate during the execution of the first deceleration control and the change rate during the execution of the second deceleration control.

A method according to at least one embodiment of the present disclosure is a deceleration assistance method for executing deceleration control of automatically decelerating a traveling vehicle (SV) based on a deceleration object in front of the vehicle (SV), the deceleration assistance method including: estimating an estimated position (S1) of the deceleration object based on target information relating to a target other than the deceleration object, the target information being acquired as target information relating to a target in front of the vehicle (SV) before the deceleration object is acquired; recognizing, when a position (S2) of the deceleration object is acquired as the target information, the acquired position as a recognized position (S2) of the deceleration object; executing, based on the estimated position (S1), first deceleration control of decelerating the vehicle (SV) at one of a constant first deceleration (G1) or a variable first deceleration (G1), and executing, based on the recognized position (S2), second deceleration control of decelerating the vehicle (SV) at one of a constant second deceleration (G2) or a variable second deceleration (G2); executing deceleration control of decelerating the vehicle at a predetermined first deceleration while the estimated position of the deceleration object is set as a first target position, and decelerating the vehicle at a predetermined second deceleration while the recognized position of the deceleration object is set as a second target position; and executing gradual change processing of gradually changing a deceleration of the vehicle (SV) from the first deceleration (G1) toward the second deceleration (G2) when the deceleration control is caused to transition from the first deceleration control to the second deceleration control, and when a difference exists between the first deceleration (G1) and the second deceleration (G2).

A program according to at least one embodiment of the present disclosure is a program for causing a computer (10) of a deceleration assistance device (1) for executing deceleration control of automatically decelerating a traveling vehicle (SV) based on a deceleration object in front of the vehicle (SV) to execute the processes of: estimating an estimated position (S1) of the deceleration object based on target information relating to a target other than the deceleration object, the target information being acquired as target information relating to a target in front of the vehicle (SV) before the deceleration object is acquired; recognizing, when a position (S2) of the deceleration object is acquired as the target information, the acquired position as a recognized position (S2) of the deceleration object; executing, based on the estimated position (S1), first deceleration control of decelerating the vehicle (SV) at one of a constant first deceleration (G1) or a variable first deceleration (G1), and executing, based on the recognized position (S2), second deceleration control of decelerating the vehicle (SV) at one of a constant second deceleration (G2) or a variable second deceleration (G2); executing deceleration control of decelerating the vehicle at a predetermined first deceleration while the estimated position of the deceleration object is set as a first target position, and decelerating the vehicle at a predetermined second deceleration while the recognized position of the deceleration object is set as a second target position; and executing gradual change processing of gradually changing a deceleration of the vehicle (SV) from the first deceleration (G1) toward the second deceleration (G2) when the deceleration control is caused to transition from the first deceleration control to the second deceleration control, and when a difference exists between the first deceleration (G1) and the second deceleration (G2).

With the above-mentioned configuration, even when a difference exists between the estimated position (S1) of the deceleration object and the recognized position (S2) of the deceleration object, and the difference exists between the first deceleration (G1) and the second deceleration (G2), a great and sudden change in deceleration of the vehicle (SV) during the deceleration control can effectively be prevented by executing the gradual change processing of gradually changing the deceleration of the vehicle (SV) from the first deceleration (G1) toward the second deceleration (G2). As a result, a behavior change of the vehicle can be suppressed, and hence the deterioration of the drivability can be prevented.

In another aspect of the present disclosure, when the deceleration control is caused to transition from the first deceleration control to the second deceleration control, the control unit (16, 17) is configured to set a larger change rate (GS) of the deceleration per unit time during the execution of the gradual change processing as the difference between the first deceleration (G1) and the second deceleration (G2) becomes larger, and to set a smaller change rate (GS) of the deceleration per unit time during the execution of the gradual change processing as the difference between the first deceleration (G1) and the second deceleration (G2) becomes smaller.

According to this aspect, when the difference between the first deceleration (G1) and the second deceleration (G2) is large, the deceleration of the vehicle (SV) can be caused to early approach from the first deceleration (G1) to the second deceleration (G2) by increasing the change rate (GS) of the deceleration per unit time during the execution of the gradual change processing, thereby being capable of effectively preventing a prolonged gradual change period. Moreover, when the difference between the first deceleration (G1) and the second deceleration (G2) is small, an excessive increase in jerk of the vehicle (SV) can effectively be prevented by reducing the change rate (GS) of the deceleration per unit time during the execution of the gradual change processing.

In another aspect of the present disclosure, the deceleration object is a stop line of an intersection positioned in front of the vehicle (SV), and the control unit (15, 16, 17) is configured to execute, when the vehicle (SV) is predicted to make one of a right turn or a left turn at the intersection, the deceleration control so that the vehicle (SV) decelerates to a predetermined target speed (Vt) appropriate for one of the right turn or the left turn before the vehicle (SV) reaches the stop line.

According to this aspect, the vehicle (SV) can reliably be decelerated to the target speed (Vt) appropriate for the left and right turns at the stop line position (S2) of the intersection while effectively suppressing the behavior change of the vehicle (SV) caused by the switching of the target position during the execution of the deceleration control.

In another aspect of the present disclosure, the deceleration object is a stop line of an intersection equipped with a signal, which is positioned in front of the vehicle (SV), the target information acquisition unit (30) is configured to recognize a lighting state of the signal, and, in a case in which the deceleration control is caused to transition from the first deceleration control to the second deceleration control, and the target information acquisition unit (30) recognizes that the lighting state of the signal is yellow, the control unit (15, 16, 17) is configured to: set a change rate (GS) of the deceleration per unit time during the execution of the gradual change processing to a smaller change rate than the change rate at a time when the target information acquisition unit (30) recognizes the lighting state of the signal as one of green or an arrow which indicates that passage is permitted, when an absolute value of the second deceleration (G2) is larger than an absolute value of the first deceleration (G1); and set the change rate (GS) of the deceleration per unit time during the execution of the gradual change processing to a larger change rate than the change rate at the time when the target information acquisition unit (30) recognizes the lighting state of the signal as one of the green or the arrow which indicates that the passage is permitted, when the absolute value of the second deceleration (G2) is smaller than the absolute value of the first deceleration (G1).

According to this aspect, in the state in which the lighting color of the signal is yellow (Y), and it is appropriate for the vehicle (SV) to turn right or left without stopping at the stop line, the increase in the deceleration is delayed when the second deceleration (G2) is higher than the first deceleration (G1), and the decrease in the deceleration is sped up when the second deceleration (G2) is lower than the first deceleration (G1), thereby being capable of preventing the vehicle (SV) from greatly decelerating before the vehicle (SV) reaches the stop line. As a result, it is possible to effectively assist the driver in making smooth right and left turns. Moreover, it is also possible to prevent a rear end collision of a following vehicle caused by the sudden deceleration of the vehicle (SV), thereby being capable of increasing safety as well.

In another aspect of the present disclosure, the control unit (15, 16, 17) is configured to: determine, during the execution of the deceleration control, whether a finish condition that a speed (V) of the vehicle (SV) decreases to a predetermined target speed (Vt) is satisfied before the vehicle (SV) reaches the recognized position (S2); and continue, when the finish condition is determined not to be satisfied, the deceleration control at a deceleration set based on a speed (V) of the vehicle (SV) at a time when the finish condition is determined not to be satisfied and the recognized position (S2) of the deceleration object recognized by the position recognition unit (14).

According to this aspect, when the finish condition for the deceleration control is determined not to be satisfied, the vehicle (SV) can reliably be decelerated to the target speed (Vt) before the vehicle (SV) reaches the deceleration object by continuing the deceleration control at the target deceleration set based on the vehicle speed (V) at this time and the position (S2) of the deceleration object.

In another aspect of the present disclosure, the control unit (15, 16, 17) is configured to continue the second deceleration control based on the recognized position (S2) recognized by the position recognition unit (14) when the target information acquisition unit (30) is brought into a state in which the position (S2) of the deceleration object fails to be acquired during the execution of the second deceleration control.

According to this aspect, the deceleration control can reliably be continued without stopping or suspending the deceleration control even when the state in which the target information acquisition unit (30) cannot acquire the position (S2) of the deceleration object occurs due to existence of a preceding vehicle or the like.

In order to facilitate the understanding of the invention, in the above description, the constituent elements of the invention corresponding to at least one embodiment of the present disclosure are suffixed in parentheses with reference symbols used in the at least one embodiment. However, the constituent elements of the invention are not intended to be limited to those in the at least one embodiment as defined by the reference symbols.

DESCRIPTION OF THE EMBODIMENTS

Description is now given of a deceleration assistance device, a vehicle, a deceleration assistance method, and a program according to at least one embodiment of the present disclosure with reference to the drawings. Like components are denoted by like reference symbols and the same applies to the names and functions of those components. Therefore, a detailed description of those components is not repeated.

[Overall Configuration]

Figure 1:
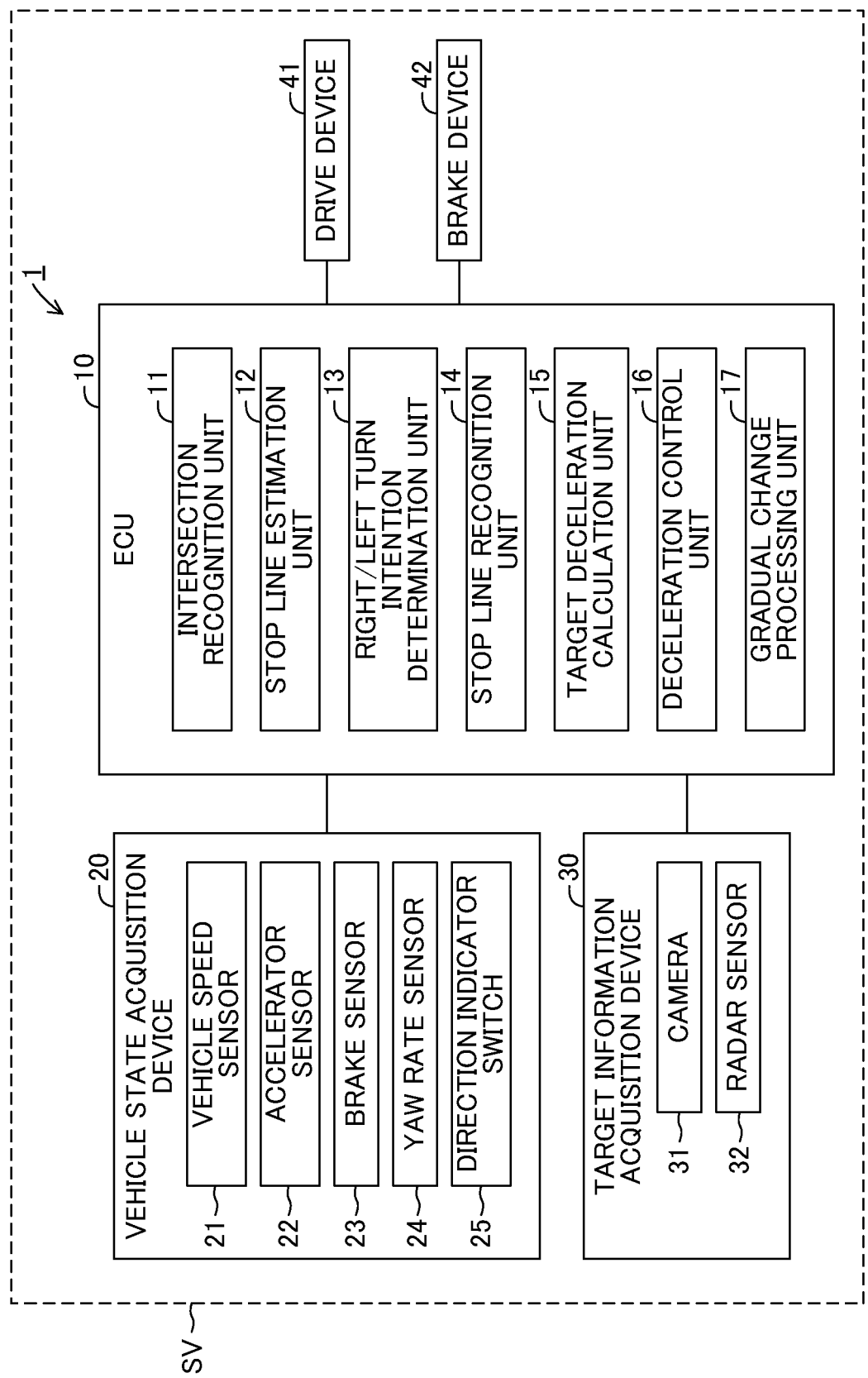
FIG. 1 is a schematic overall configuration diagram of a deceleration assistance device according to at least one embodiment of the present disclosure.

FIG. 1 is a schematic overall configuration diagram of a deceleration assistance device 1 according to the at least one embodiment. The deceleration assistance device 1 is mounted to a vehicle SV, and includes an ECU 10. The ECU 10 includes a microcomputer as a main component. The term "ECU" is an abbreviation for "electronic control unit." The microcomputer includes a CPU, a ROM, a RAM, and an interface, for example, and the CPU implements various functions by executing instructions (programs, or routines) stored in the ROM.

The ECU 10 is a central control device which executes driving assistance for a driver, and executes deceleration assistance control. The deceleration assistance control is control of automatically decelerating, when an intersection is detected as a deceleration object in front of the traveling vehicle SV, and the driver of the vehicle SV intends to turn right or turn left at the intersection, the vehicle SV to a predetermined target speed Vt appropriate for the right turn or the left turn. The target speed Vt is not particularly limited, but is basically a speed higher than 0 (zero), and can be set to an appropriate speed in accordance with specifications of the vehicle SV and the like. The deceleration assistance control is executed by the ECU 10 controlling operations of a drive device 41, brake devices 42, and the like based on a travel state of the vehicle SV and a situation around the vehicle SV. Thus, the ECU 10 is connected for communication to the drive device 41, the brake devices 42, a vehicle state acquisition device 20, a target information acquisition device 30, and the like.

The drive device 41 generates a driving force to be transmitted to driving wheels of the vehicle SV. As the drive device 41, for example, an engine and a motor are given. In the device according to the at least one embodiment, the vehicle SV may be any one of a hybrid electric vehicle (HEV), a plug-in hybrid electric vehicle (PHEV), a fuel cell electric vehicle (FCEV), a battery electric vehicle (BEV), and an engine vehicle. The brake devices 42 are, for example, disc brake devices, and apply braking forces to the wheels of the vehicle SV.

The vehicle state acquisition device 20 is sensors which acquire states of the vehicle SV. Specifically, the vehicle state acquisition device 20 includes a vehicle speed sensor 21, an accelerator sensor 22, a brake sensor 23, a yaw rate sensor 24, a direction indicator switch 25, and the like.

The vehicle speed sensor 21 detects a travel speed of the vehicle SV (vehicle speed V), and transmits the detected vehicle speed V to the ECU 10. The vehicle speed sensor 21 may be a wheel speed sensor. The accelerator sensor 22 detects an operation amount of an accelerator pedal (not shown) by the driver, and transmits the detected accelerator operation amount to the ECU 10. The brake sensor 23 detects an operation amount of a brake pedal (not shown) by the driver, and transmits the detected brake operation amount to the ECU 10. The yaw rate sensor 24 detects a yaw rate of the vehicle SV, and transmits the detected value of the yaw rate to the ECU 10. The direction indicator switch 25 detects an operation direction of a direction indicator lever (not shown) by the driver. When the driver operates the direction indicator lever clockwise, the direction indicator switch 25 transmits, to the ECU 10, a signal indicating that the operation indicator lever is operated clockwise. Moreover, when the driver operates the direction indicator lever counterclockwise, the direction indicator switch 25 transmits, to the ECU 10, a signal indicating that the operation indicator lever is operated counterclockwise.

The target information acquisition device 30 is sensors which acquire target information on targets around the vehicle SV. Specifically, the target information acquisition device 30 includes a camera 31, a radar sensor 32, and the like. In this case, as the target information, there are given, for example, a peripheral vehicle, an intersection, a traffic signal, a traffic sign, a white line of a road, a stop line, a fallen object, and the like. The target information on the targets around the vehicle SV acquired by the target information acquisition device 30 is transmitted to the ECU 10.

The camera 31 is arranged on, for example, a top portion of a front wind shield glass of the vehicle SV. The camera 31 is, for example, a stereo camera or a monocular camera, and a digital camera having an image pickup element such as a CMOS or a CCD can be used. The camera 31 captures a region in front of the vehicle SV, and processes captured image data, to thereby acquire the target information on the region in front of the vehicle SV. The target information is information indicating a type of the target detected in front of the vehicle SV, a relative distance between the vehicle SV and the target, a relative speed between the vehicle SV and the target, and the like. It is only required to recognize the type of the target through, for example, machine learning such as pattern matching.

The radar sensor 32 is provided in, for example, a front end portion of the vehicle SV, and detects a target existing in a region in front of the vehicle SV. The radar sensor 32 includes a millimeter wave radar or Lidar. The millimeter wave radar radiates a radio wave (millimeter wave) in a millimeter wave band, and receives the millimeter wave (reflected wave) reflected by a target existing within a radiation range. The millimeter wave radar acquires the relative distance between the vehicle SV and the target, the relative speed between the vehicle SV and the target, and the like based on a phase difference between the transmitted millimeter wave and the received reflected wave, an attenuation level of the reflected wave, a time from the transmission of the millimeter wave to the reception of the reflected wave, and the like. The Lidar sequentially scans laser light in a pulse form having a shorter wavelength than that of the millimeter wave in a plurality of directions, and receives reflected light reflected by a target, to thereby acquire a shape of the target detected in front of the vehicle SV, the relative distance between the vehicle SV and the target, the relative speed between the vehicle SV and the target, and the like.

[Deceleration Assistance Control]

Next, description is given of the deceleration assistance control. When the function of the ECU 10 is focused upon, the ECU 10 includes, as a part of functional elements, an intersection recognition unit 11, a stop line estimation unit 12, a right/left turn intention determination unit 13, a stop line recognition unit 14, a target deceleration calculation unit 15, a deceleration control unit 16, and a gradual change processing unit 17. Those functional elements are included in the ECU 10 which is integrated hardware, but any part thereof may be provided to an ECU independent of the ECU 10. Moreover, a part of the functional elements of the ECU 10 may be provided to an external information processing device or the like which can communicate to and from the vehicle SV.

The intersection recognition unit 11 recognizes an intersection in front of the vehicle SV (the closest intersection when a plurality of intersections continuously exist in front) based on the target information acquired by the target information acquisition device 30. The intersection recognition unit 11 executes, for example, machine learning such as pattern matching based on image data on signals, signs, and the like of the intersection captured by the camera 31, to thereby recognize the intersection. The intersection recognition unit 11 may recognize the intersection through other image processing, or may recognize the intersection based on the target information acquired by the radar sensor 32.

The intersection recognition unit 11 recognizes a relative position of the intersection with respect to the vehicle SV. The intersection recognition unit 11 applies image processing to the image data captured by the camera 31, thereby being capable of recognizing the relative position of the intersection through use of a publicly known method. The intersection recognition unit 11 may combine the image processing for the image data of the camera 31 and the detection result obtained by the radar sensor 32, to thereby recognize the relative position of the intersection. As another example, the intersection recognition unit 11 may recognize the position of the intersection based on data communication to and from an intelligent transport system (ITS), or may recognize the position of the intersection based on a current position of the vehicle SV acquired from GPS signals and map data of a navigation system.

When the intersection recognition unit 11 recognizes the intersection in front of the vehicle SV, the stop line estimation unit 12 estimates a stop line position of the recognized intersection. The stop line estimation unit 12 estimates, as the stop line position, for example, a position on the vehicle SV side apart by a predetermined distance "d" from the position of the intersection recognized by the intersection recognition unit 11. In this case, the predetermined distance "d" is not particularly limited, but it is preferred that the predetermined distance "d" be set based on a distance having a length with which the stop line position is not erroneously estimated so that the stop line is located inside the intersection.

The stop line estimation unit 12 estimates the relative position of the stop line with respect to the vehicle SV at a predetermined cycle under a state in which the vehicle SV approaches the intersection. The stop line estimation unit 12 sets, as an initial estimated position, the stop line position estimated first based on the position of the intersection, and subsequently estimates the relative position of the stop line at the predetermined cycle based on a position change amount of the vehicle SV with respect to the initial estimated position. The position change amount of the vehicle SV may be calculated through, for example, odometry based on a detection result obtained by the vehicle speed sensor 21 or the yaw rate sensor 24, or may be calculated based on a trajectory of the vehicle SV acquired from the GPS signals or the like. The relative position of the stop line with respect to the vehicle SV estimated by the stop line estimation unit 12 is hereinafter referred to as "estimated stop line position S1."

When the intersection recognition unit 11 recognizes the intersection in front of the vehicle SV, the right/left turn intention determination unit 13 determines whether or not the driver has an intention to turn right or to turn left at the intersection (hereinafter referred to as "right/left turn intention"). The right/left turn intention determination unit 13 determines that the driver has the right/left turn intention when the direction indicator switch 25 detects any one of a right operation signal or a left operation signal in a case in which, for example, the distance between the vehicle SV and the intersection becomes equal to or shorter than a predetermined threshold value distance Dv.

In this case, the existence of the right/left turn intention of the driver is a trigger for starting deceleration control described later. When the deceleration control is started when the camera 31 recognizes the stop line of the intersection, the deceleration control is started at a timing at which the vehicle is closer to the intersection than a position considered appropriate by the driver, resulting in uncomfortable feeling sensed by the driver. Thus, it is preferred that the threshold value distance Dv to be used to determine the right/left turn intention be set to a distance longer than the distance at which the camera 31 can recognize the stop line of the intersection.

The right/left turn intention determination unit 13 may determine that the driver has the right/left turn intention when the distance between the vehicle SV and the intersection is equal to or shorter than the predetermined threshold value distance Dv, and the driver releases stepping on the accelerator pedal (accelerator OFF). Moreover, the right/left turn intention determination unit 13 may determine that the driver has the right/left turn intention when the target information acquisition device 30 acquires the fact that the vehicle SV is traveling on a right-turn-only lane or a left-turn-only lane of the intersection. Moreover, the right/left turn intention determination unit 13 may determine that the driver has the right/left turn intention when a route set by the navigation system is set to a route on which the right turn or the left turn is to be executed at the intersection.

The stop line recognition unit 14 recognizes a stop line of an intersection in front of the vehicle SV (stop line of the closest intersection when a plurality of intersections continuously exist in front) based on the target information acquired by the target information acquisition device 30. The stop line recognition unit 14 recognizes the relative position of the stop line with respect to the vehicle SV through machine learning such as pattern matching based on, for example, the image data on a front region of the vehicle SV captured by the camera 31. The stop line recognition unit 14 may recognize the position of the stop line through other image processing, or may recognize the position of the stop line based on the target information acquired by the radar sensor 32.

The stop line recognition unit 14 recognizes the relative position of the stop line with respect to the vehicle SV at a predetermined cycle under the state in which the vehicle SV approaches the intersection. The stop line recognition unit 14 sets, as an initial recognized position, the position of the stop line recognized when the target information acquisition device 30 first acquires the stop line, and subsequently recognizes the relative position of the stop line at a predetermined cycle based on a position change amount of the vehicle SV with respect to the initial recognized position. The position change amount of the vehicle SV may be calculated through, for example, odometry based on the detection result obtained by the vehicle speed sensor 21 or the yaw rate sensor 24, or may be calculated based on the trajectory of the vehicle SV acquired from the GPS signals or the like. As described above, the position of the stop line recognized first is set as the initial recognized position, and the relative position of the stop line is subsequently recognized based on the position change amount of the vehicle SV. Thus, even when, for example, a state in which the camera 31 cannot acquire the stop line acquired once occurs due to existence of a preceding vehicle or the like, the relative position of the stop line can reliably be recognized.

The relative position of the stop line with respect to the vehicle SV recognized by the stop line recognition unit 14 is hereinafter referred to as "recognized stop line position S2."

Under the state in which the vehicle SV approaches the intersection, the target information acquisition device 30 first acquires, for example, signals and signs of the intersection before the stop line of the intersection is acquired. Thus, the intersection recognition unit 11 recognizes the position of the intersection based on the signals, the signs, and the like, and the stop line estimation unit 12 estimates the estimated stop line position S1 from the position of the intersection. After that, the stop line recognition unit 14 recognizes the recognized stop line position S2 based on the detection result obtained by the target information acquisition device 30.

Figure 2:
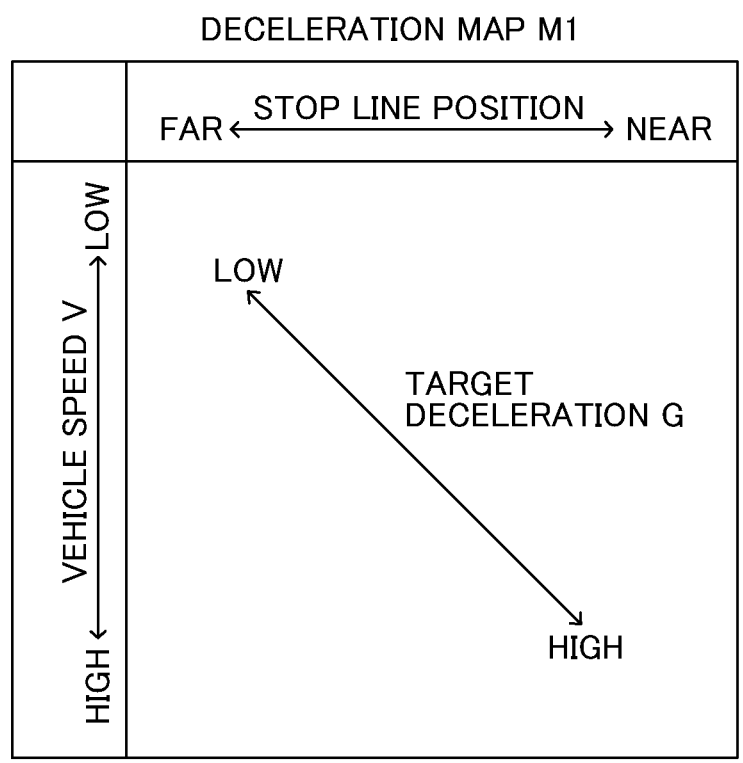
FIG. 2 is a schematic graph for showing an example of a deceleration map in the at least one embodiment.

The target deceleration calculation unit 15 calculates a target deceleration G required to decelerate the vehicle SV to a predetermined target speed Vt appropriate for the right turn or the left turn before the vehicle SV reaches the stop line of the intersection. In this case, the target deceleration G can be calculated based on, for example, a deceleration map M1 (see FIG. 2) stored in advance in the ROM of the ECU 10. This deceleration map M1 is a map referred to based on, for example, the vehicle speed V and the stop line position, and is set such that the target deceleration G (absolute value) increases as the vehicle speed V becomes higher and the stop line position becomes closer.

When the right/left turn intention determination unit 13 determines that the driver has the right/left turn intention, the target deceleration calculation unit 15 refers to the deceleration map M1 based on the vehicle speed V at this time and the estimated stop line position S1, to thereby calculate a target deceleration (hereinafter referred to as "first target deceleration G1") required to decelerate the vehicle SV to the target speed Vt before the vehicle SV reaches the estimated stop line position S1.

Moreover, when the target information acquisition device 30 acquires the stop line of the intersection, and the stop line recognition unit 14 accordingly recognizes the recognized stop line position S2, the target deceleration calculation unit 15 refers to the deceleration map M1 based on the vehicle speed V at this time and the recognized stop line position S2, to thereby calculate a target deceleration (hereinafter referred to as "second target deceleration G2") required to decelerate the vehicle SV to the target speed Vt before the vehicle SV reaches the recognized stop line position S2.

The calculation of the first target deceleration G1 and the second target deceleration G2 is not limited to the calculation method which uses the deceleration map M1, and may be calculated based on an expression "$G=(V_t^2-V_0^2)/2L$," where Vt represents a target speed, $V_0$ represents an initial speed, and L represents a distance to the stop line. Moreover, the first target deceleration G1 and the second target deceleration G2 may be constant values which hold values calculated based on the deceleration map M1 or the expression, or variable values changed in accordance with a predetermined profile by referring to the deceleration map M1 or the expression at a predetermined calculation cycle. In the following, it is assumed that the first target deceleration G1 and the second target deceleration G2 are set to constant values for the convenience of description.

The deceleration control unit 16 executes the deceleration control of decelerating the vehicle SV at the target decelerations G1 and G2 calculated by the target deceleration calculation unit 15. When the right/left turn intention determination unit 13 determines that the driver has the right/left turn intention, the deceleration control unit 16 executes first deceleration control of setting the estimated stop line position S1 as the target position, and decelerating the vehicle SV at the first target deceleration G1. The first deceleration control is executed by controlling an operation of the brake devices 42 based on a deviation between an actual deceleration (hereinafter referred to as "actual deceleration GA") of the vehicle SV and the first target deceleration G1. The actual deceleration GA may be obtained by differentiating the vehicle speed V detected by the vehicle speed sensor 21, or may be acquired by an acceleration sensor when the vehicle state acquisition device 20 includes the acceleration sensor.

When the stop line recognition unit 14 recognizes the recognized stop line position S2 based on the detection result obtained by the target information acquisition device 30 during the execution of the first deceleration control, the deceleration control unit 16 executes second deceleration control of setting the recognized stop line position S2 as the target position, and decelerating the vehicle SV at the second target deceleration G2. It is only required to execute the second deceleration control by controlling the operation of the brake devices 42 based on a deviation between the actual deceleration GA of the vehicle SV and the second target deceleration G2 as in the first deceleration control. The first deceleration control and the second deceleration control may use not only braking forces of the brake devices 42, but also engine braking when the drive device 41 is an engine or regenerative braking when the drive device 41 is a motor.

Consideration is now given of a case in which the deceleration control unit 16 causes the deceleration control to transition from the first deceleration control to the second deceleration control by switching the target deceleration from the first target deceleration G1 to the second target deceleration G2, that is, a case in which the target position of the deceleration control is switched from the estimated stop line position S1 to the recognized stop line position S2. The estimated stop line position S1 is the position of the stop line estimated from the detection result obtained by the target information acquisition device 30. The recognized stop line position S2 is the position of the stop line directly recognized from the detection result obtained by the target information acquisition device 30. Thus, a difference may occur between the estimated stop line position S1 and the recognized stop line position S2 depending on a travel state of the vehicle SV, a geography around the intersection, environmental conditions, and the like. When the difference occurs between the estimated stop line position S1 and the recognized stop line position S2, a difference also occurs between the first target deceleration G1 and the second target deceleration G2, which are calculated based thereon.

Figure 3:
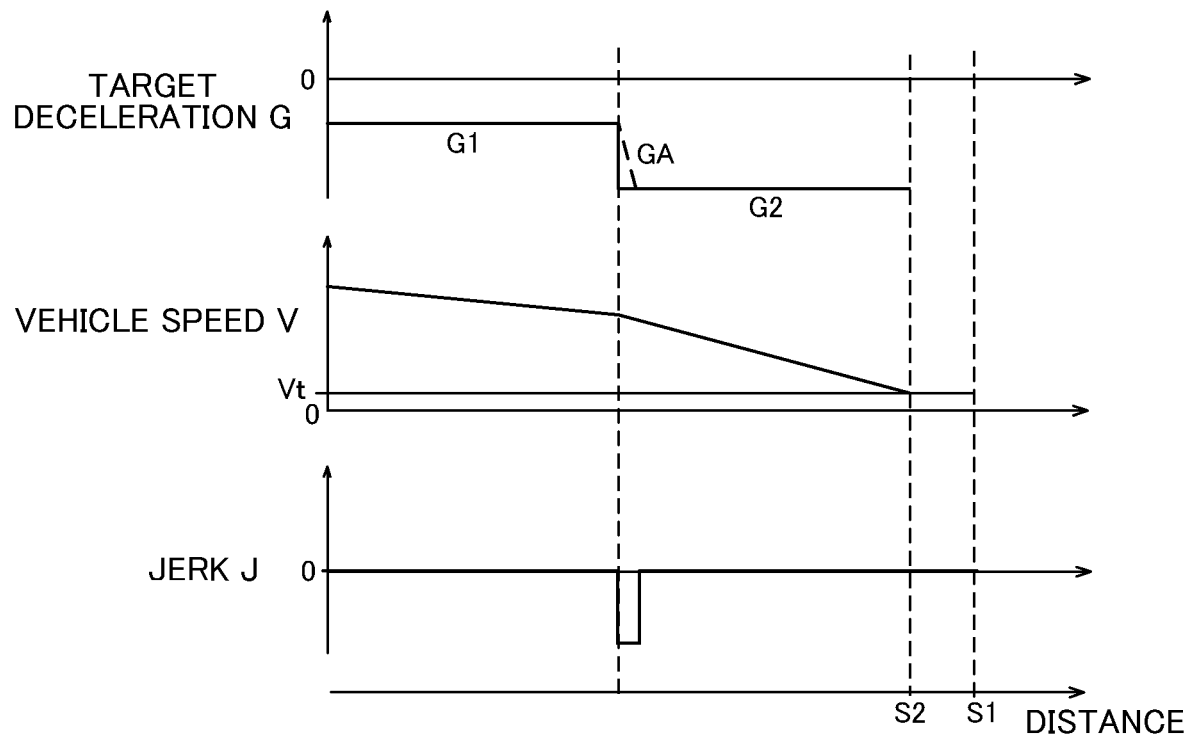
FIG. 3 is a schematic graph for showing an example of deceleration assistance control in a comparative example.
Figure 4:
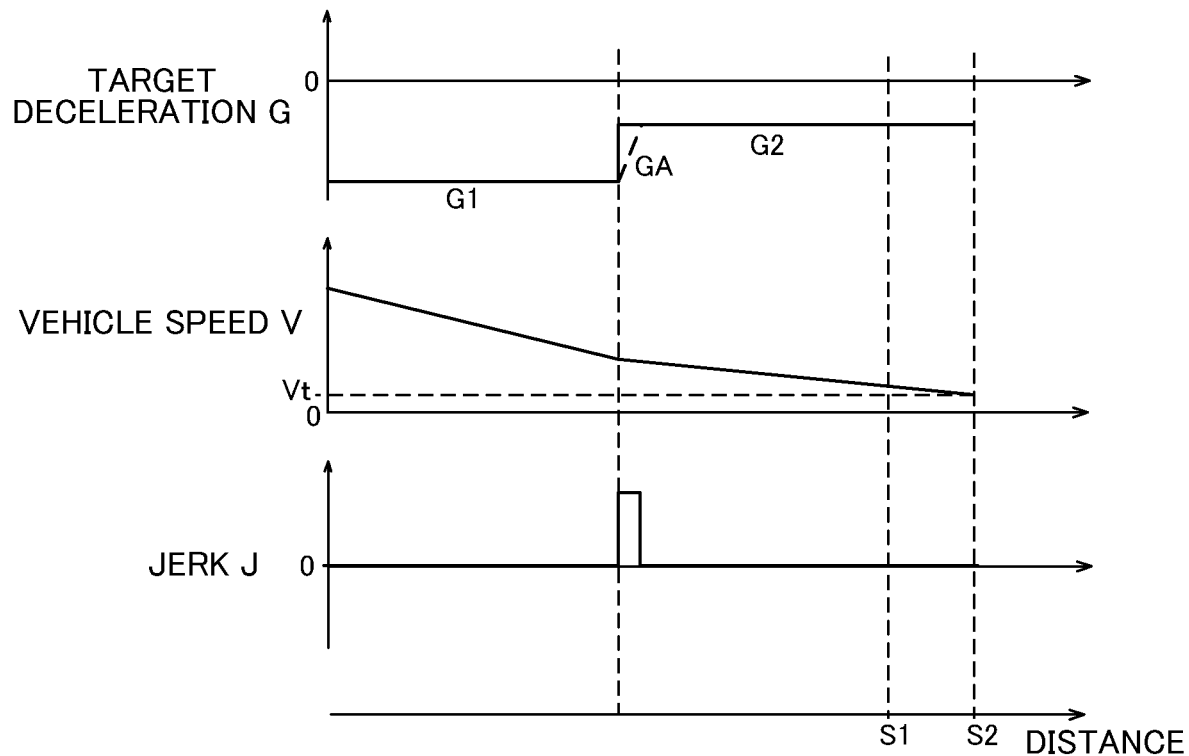
FIG. 4 is a schematic graph for showing an example of the deceleration assistance control in the comparative example.

Referring to FIG. 3 and FIG. 4, description is now given of specific examples. FIG. 3 is a graph for showing an example at the time when the recognized stop line position S2 is on the vehicle SV side with respect to the estimated stop line position S1. FIG. 4 is a graph for showing an example at the time when the estimated stop line position S1 is on the vehicle SV side with respect to the recognized stop line position S2.

In the example shown in FIG. 3, the recognized stop line position S2 is on the vehicle SV side with respect to the estimated stop line position S1, and hence the absolute value of the second target deceleration G2 calculated based on the recognized stop line position S2 is larger than the absolute value of the first target deceleration G1 calculated based on the estimated stop line position S1. Thus, when the target deceleration is immediately switched from the first target deceleration G1 to the second target deceleration G2, the actual deceleration GA (broken line) of the vehicle SV rapidly decreases, and hence a negative jerk J occurs in the vehicle SV.

In the example shown in FIG. 4, the estimated stop line position S1 is on the vehicle SV side with respect to the recognized stop line position S2, and hence the absolute value of the first target deceleration G1 calculated based on the estimated stop line position S1 is larger than the absolute value of the second target deceleration G2 calculated based on the recognized stop line position S2. Thus, when the target deceleration is immediately switched from the first target deceleration G1 to the second target deceleration G2, the actual deceleration GA (broken line) of the vehicle SV rapidly increases, and hence a positive jerk J occurs in the vehicle SV.

That is, in any one of the cases of FIG. 3 and FIG. 4, when the target deceleration is switched from the first target deceleration G1 to the second target deceleration G2 as a result of the switching of the target position from the estimated stop line position S1 to the recognized stop line position S2, there is a problem in that a behavior of the vehicle SV is suddenly changed, and deterioration of drivability is thus induced.

In order to solve this problem, the ECU 10 in the at least one embodiment includes the gradual change processing unit 17 which executes gradual change processing of gradually changing the target deceleration from the first target deceleration G1 toward the second target deceleration G2 when the target position is switched from the estimated stop line position S1 to the recognized stop line position S2. Description is now given of details of the gradual change processing.

[Gradual Change Processing]

The gradual change processing unit 17 calculates the difference between the first target deceleration G1 and the second target deceleration G2 when the stop line recognition unit 14 recognizes the recognized stop line position S2, and the target deceleration calculation unit 15 calculates the second target deceleration G2. The gradual change processing unit 17 does not execute the gradual change processing when the calculated difference (absolute value) is equal to or smaller than a predetermined deceleration threshold value Gv. Meanwhile, the gradual change processing unit 17 executes the gradual change processing when the calculated difference (absolute value) exceeds the predetermined deceleration threshold value Gv. The deceleration threshold value Gv is not particularly limited, and it is only required to set the deceleration threshold value Gv based on, for example, a relatively small change amount of the deceleration which does not cause discomfort feeling of the driver.

The gradual change processing unit 17 executes the gradual change processing when the execution condition that the difference (absolute value) exceeds the predetermined deceleration threshold value Gv is satisfied. The gradual change processing unit 17 gradually changes the target deceleration from the first target deceleration G1 toward the second target deceleration G2 based on a change rate (hereinafter referred to as "change gradient GS") of the deceleration per unit time set in advance. The change gradient GS is not particularly limited, and it is only required to, for example, experimentally obtain a change rate of the deceleration per unit time which does not cause the discomfort feeling of the driver, and to set the change gradient GS based on this change rate. Moreover, when the first target deceleration G1 and the second target deceleration G2 are not constant values, but variable values which are changed in accordance with the predetermined profile, it is only required to set the change gradient GS to a value different from the change rate (change tendency) of the deceleration during the execution of the first deceleration control and the second deceleration control.

Figure 5:
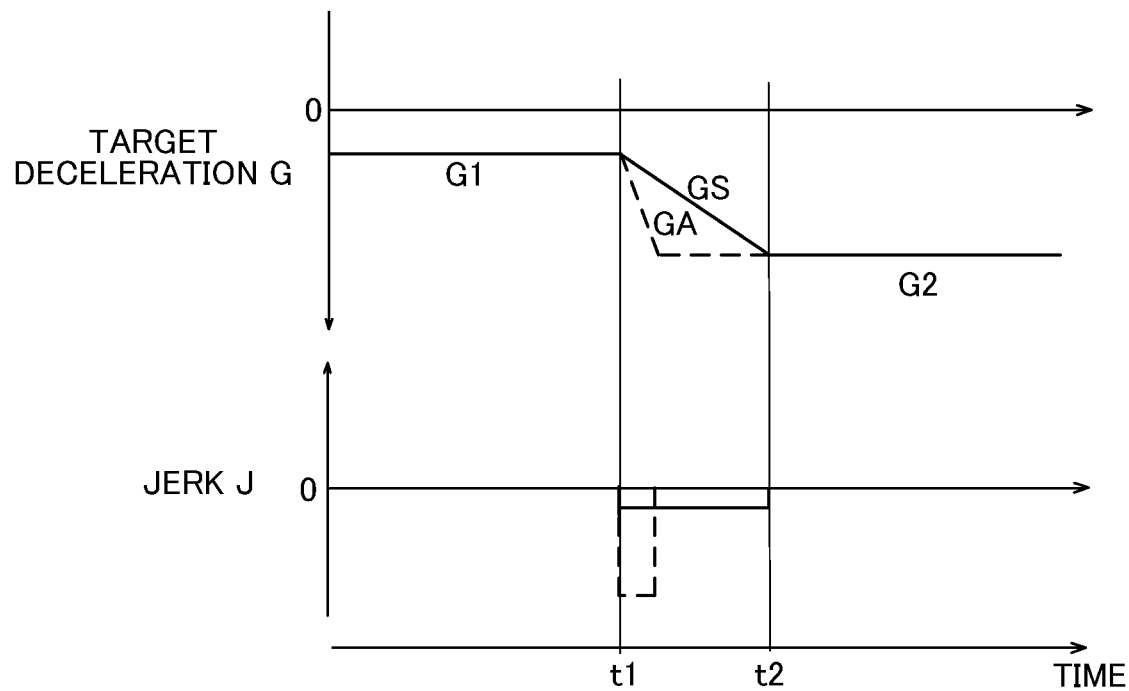
FIG. 5 is a schematic graph for showing deceleration assistance control in the at least one embodiment.
Figure 6:
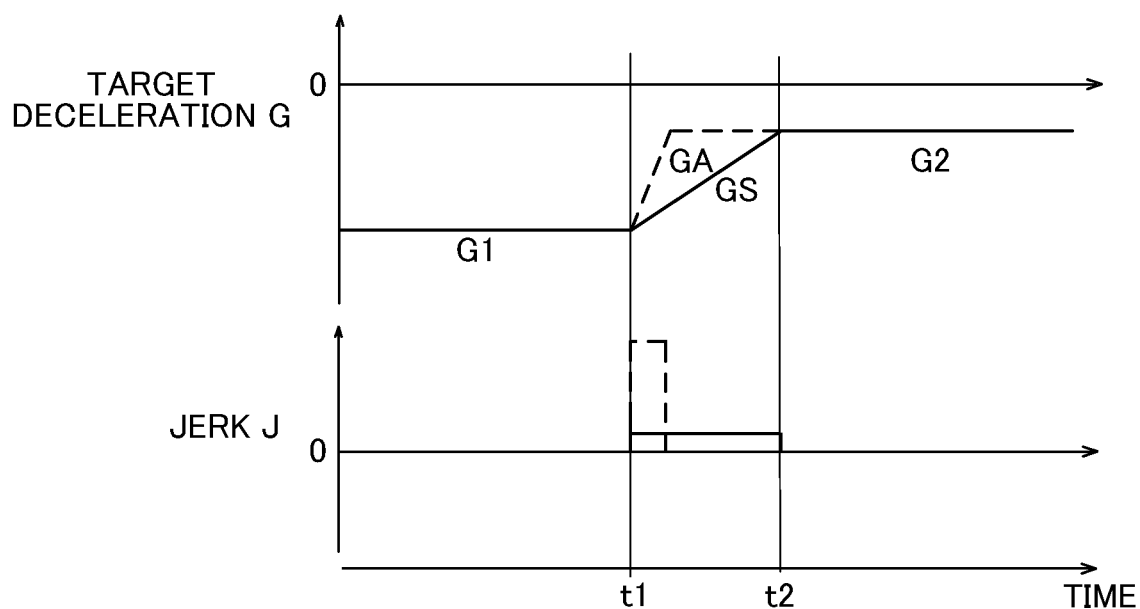
FIG. 6 is a schematic graph for showing the deceleration assistance control in the at least one embodiment.

FIG. 5 is a graph for showing the gradual change processing at the time when the absolute value of the second target deceleration G2 is larger than the absolute value of the first target deceleration G1. FIG. 6 is a graph for showing the gradual change processing at the time when the absolute value of the second target deceleration G2 is smaller than the absolute value of the first target deceleration G1. The broken lines of FIG. 5 and FIG. 6 indicate actual decelerations GA (comparative examples) at the time when the target deceleration is instantaneously switched from the first target deceleration G1 to the second target deceleration G2.

As shown in FIG. 5, when the absolute value of the second target deceleration G2 is larger than the absolute value of the first target deceleration G1, the gradual change processing unit 17 gradually reduces the target deceleration from the first target deceleration G1 toward the second target deceleration G2 over a period from a time t1 to a time t2 based on the change gradient GS (decrease gradient) set in advance. During the gradual change period from the time t1 to the time t2, the deceleration control unit 16 executes the deceleration control based on the target deceleration which is gradually reduced by the gradual change processing. In this manner, the jerk J can effectively be reduced, to thereby reliably suppress the behavior change in the vehicle SV by executing the gradual change processing of limiting the decrease amount of the target deceleration per unit time over the period from the time t1 to the time t2 compared with the comparative examples (broken lines) in which the target deceleration is switched instantaneously.

As shown in FIG. 6, when the absolute value of the second target deceleration G2 is smaller than the absolute value of the first target deceleration G1, the gradual change processing unit 17 gradually increases the target deceleration from the first target deceleration G1 toward the second target deceleration G2 over the period from the time t1 to the time t2 based on the change gradient GS (increase gradient) set in advance. During the gradual change period from the time t1 to the time t2, the deceleration control unit 16 executes the deceleration control based on the target deceleration which is gradually increased by the gradual change processing. In this manner, the jerk J can effectively be reduced, to thereby reliably suppress the behavior change in the vehicle SV by executing the gradual change processing of limiting the increase amount of the target deceleration per unit time over the period from the time t1 to the time t2 compared with the comparative examples (broken lines) in which the target deceleration is switched instantaneously.

Figure 7:
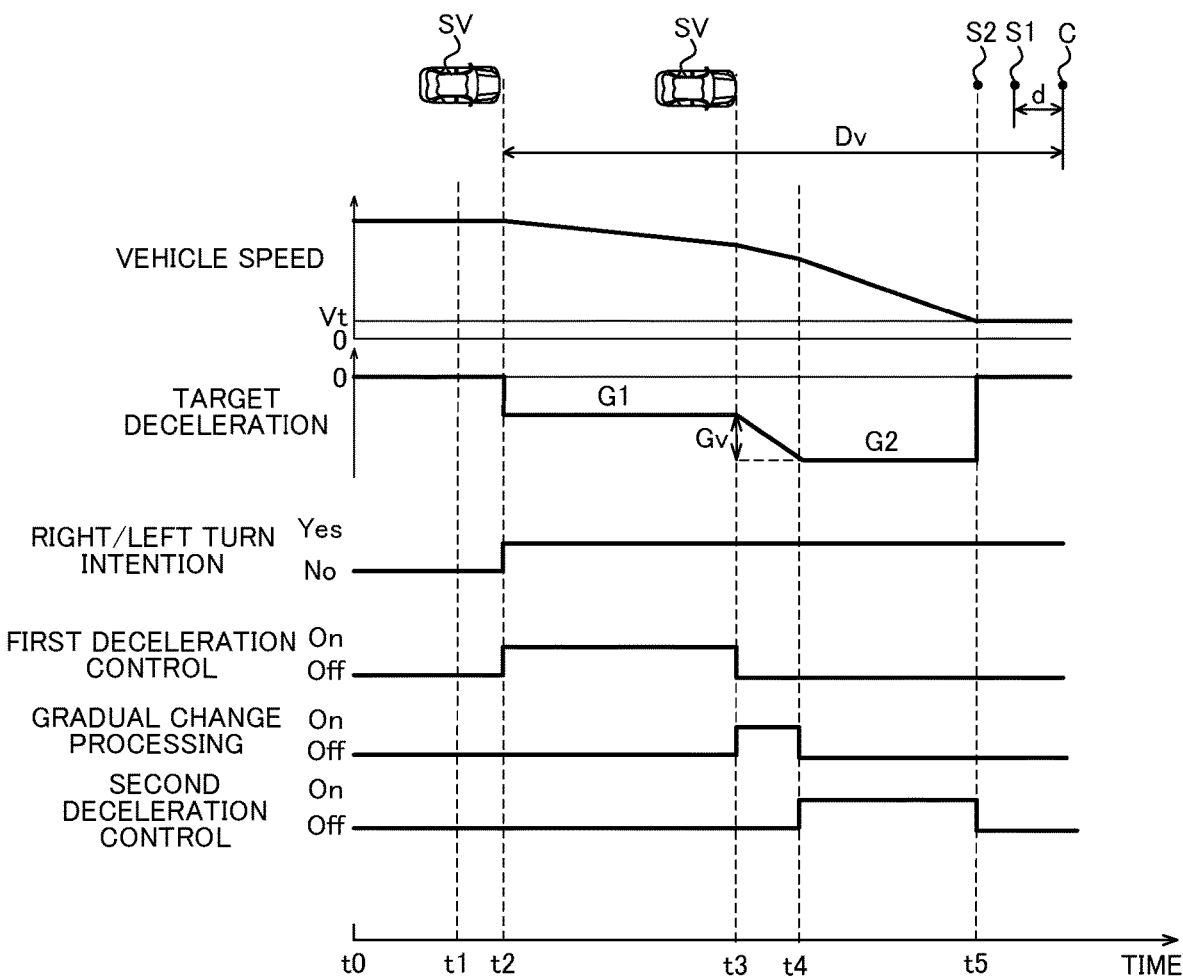
FIG. 7 is a timing chart for showing the deceleration assistance control in the at least one embodiment.
Figure 8:
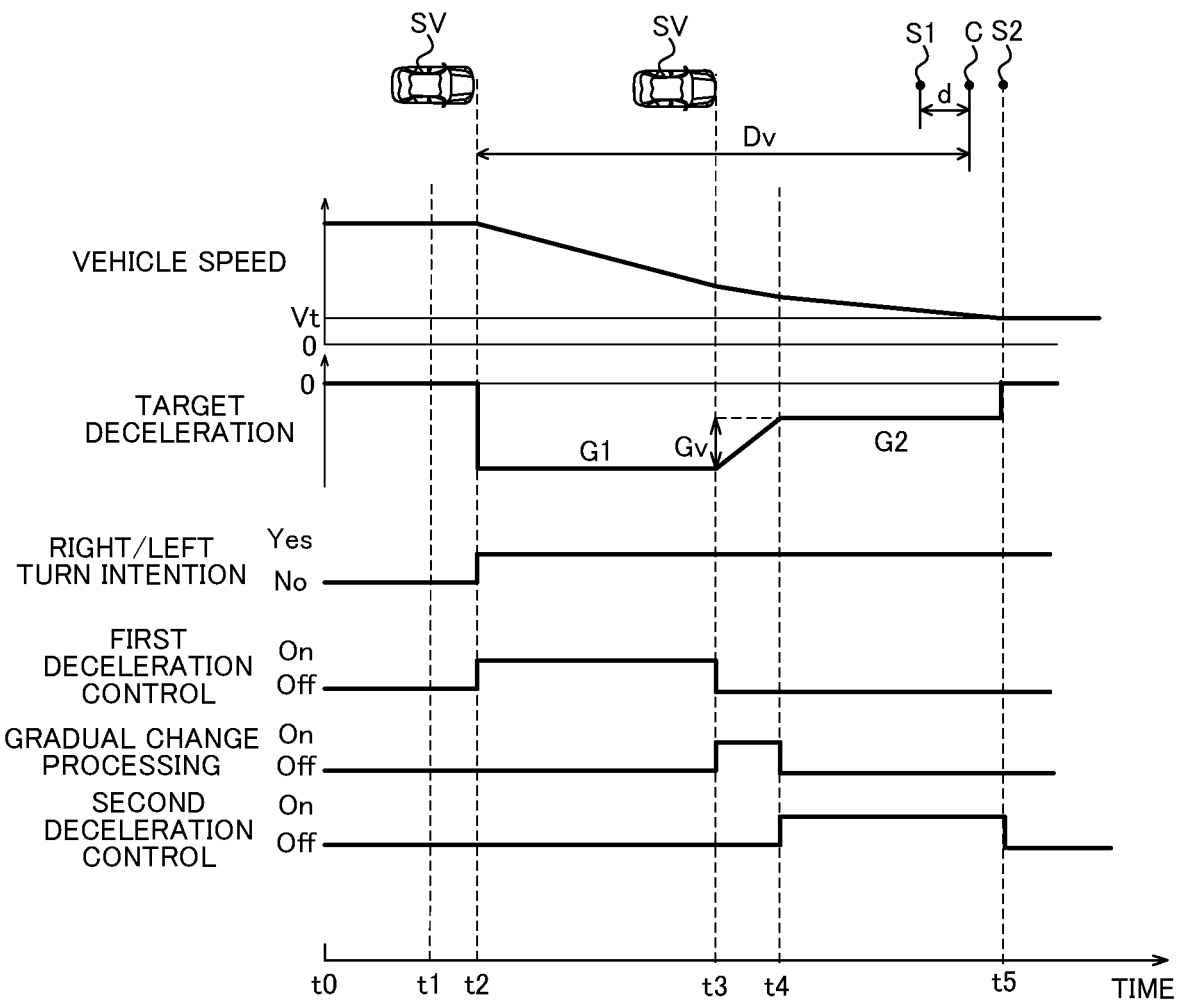
FIG. 8 is a timing chart for showing the deceleration assistance control in the at least one embodiment.

Next, description is given of specific flows of the deceleration assistance control in the at least one embodiment of the present disclosure with reference to timing charts of FIG. 7 and FIG. 8.

The vehicle SV is traveling at a predetermined vehicle speed from a time t0 to the time t1 of FIG. 7 and FIG. 8. In this case, the travel of the vehicle SV includes, for example, automatic travel through adaptive cruise control (ACC) and coasting travel in which the driver sets the accelerator operation to OFF. When the intersection recognition unit 11 recognizes an intersection C at the time t1, the stop line estimation unit 12 estimates, as the estimated stop line position S1, a position on the vehicle SV side apart from the intersection C by the predetermined distance "d."

When the distance between the vehicle SV and the intersection C is equal to or shorter than the threshold value distance Dv, and the right/left turn intention determination unit 13 determines that the driver has the right/left turn intention at the time t2, the target deceleration calculation unit 15 calculates the first target deceleration G1 based on the vehicle speed V at this time and the estimated stop line position S1. Moreover, when the first target deceleration G1 is calculated, the deceleration control unit 16 starts the first deceleration control of decelerating the vehicle SV at the calculated first target deceleration G1. When the driver operates the brake pedal in a period from the time t2 to a time t3, and a driver-requested deceleration is higher than the first target deceleration G1, the ECU 10 executes brake override of decelerating the vehicle SV at the driver-requested deceleration.

When the target information acquisition device 30 acquires the stop line, and the stop line recognition unit 14 accordingly recognizes the recognized stop line position S2 at the time t3, the target deceleration calculation unit 15 calculates the second target deceleration G2 based on the vehicle speed V at this time and the recognized stop line position S2. Moreover, when the second target deceleration G2 is calculated, the gradual change processing unit 17 determines whether or not the difference (absolute value) between the first target deceleration G1 and the second target deceleration G2 exceeds the predetermined deceleration threshold value Gv. When the difference exceeds the deceleration threshold value Gv, the gradual change processing unit 17 starts the gradual change processing from the time t3.

Specifically, in the example of FIG. 7, the recognized stop line position S2 is closer to the vehicle SV than the estimated stop line position S1, and hence the second target deceleration G2 is calculated so that the second target deceleration G2 (absolute value) is higher than the first target deceleration G1 (absolute value). In this case, from the time t3 at which the execution condition is satisfied, the gradual change processing unit 17 executes the gradual change processing of gradually reducing the target deceleration from the first target deceleration G1 toward the second target deceleration G2 based on the change gradient GS (decrease gradient) set in advance. In a period from the time t3 to a time t4 at which the target deceleration is decreased to the second target deceleration G2, the deceleration control unit 16 executes the gradual deceleration control of decelerating the vehicle SV based on the target deceleration which gradually decreases. The behavior change of the vehicle SV can effectively be suppressed by executing the gradual change processing of limiting the decrease amount of the deceleration per unit time over the gradual change period from the time t3 to the time t4.

Meanwhile, in the example of FIG. 8, the recognized stop line position S2 is farther from the vehicle SV than the estimated stop line position S1, and hence the second target deceleration G2 is calculated so that the second target deceleration G2 (absolute value) is lower than the first target deceleration G1 (absolute value). In this case, from the time t4 at which the execution condition is satisfied, the gradual change processing unit 17 executes the gradual change processing of gradually increasing the deceleration of the vehicle SV from the first target deceleration G1 toward the second target deceleration G2 based on the change gradient GS (increase gradient) set in advance. When the deceleration increases to the second target deceleration G2 at a time t5, the gradual change processing unit 17 finishes the gradual change processing. The behavior change of the vehicle SV can effectively be suppressed by executing the gradual change processing of limiting the increase amount of the target deceleration over the gradual change period from the time t3 to the time t4.

When the gradual change processing is finished at the time t4, the deceleration control unit 16 starts the second deceleration control of decelerating the vehicle SV at the second target deceleration G2. When the driver operates the brake pedal in a period from the time t4 to a time t5, and the driver-requested deceleration is higher than the second target deceleration G2, the ECU 10 executes the brake override of decelerating the vehicle SV at the driver-requested deceleration. When, at the time t5, the vehicle SV reaches the recognized stop line position S2, and the vehicle speed V of the vehicle SV is reduced to the predetermined target speed Vt appropriate for the right or left turn, the ECU 10 finishes the deceleration assistance control.

Figure 9:
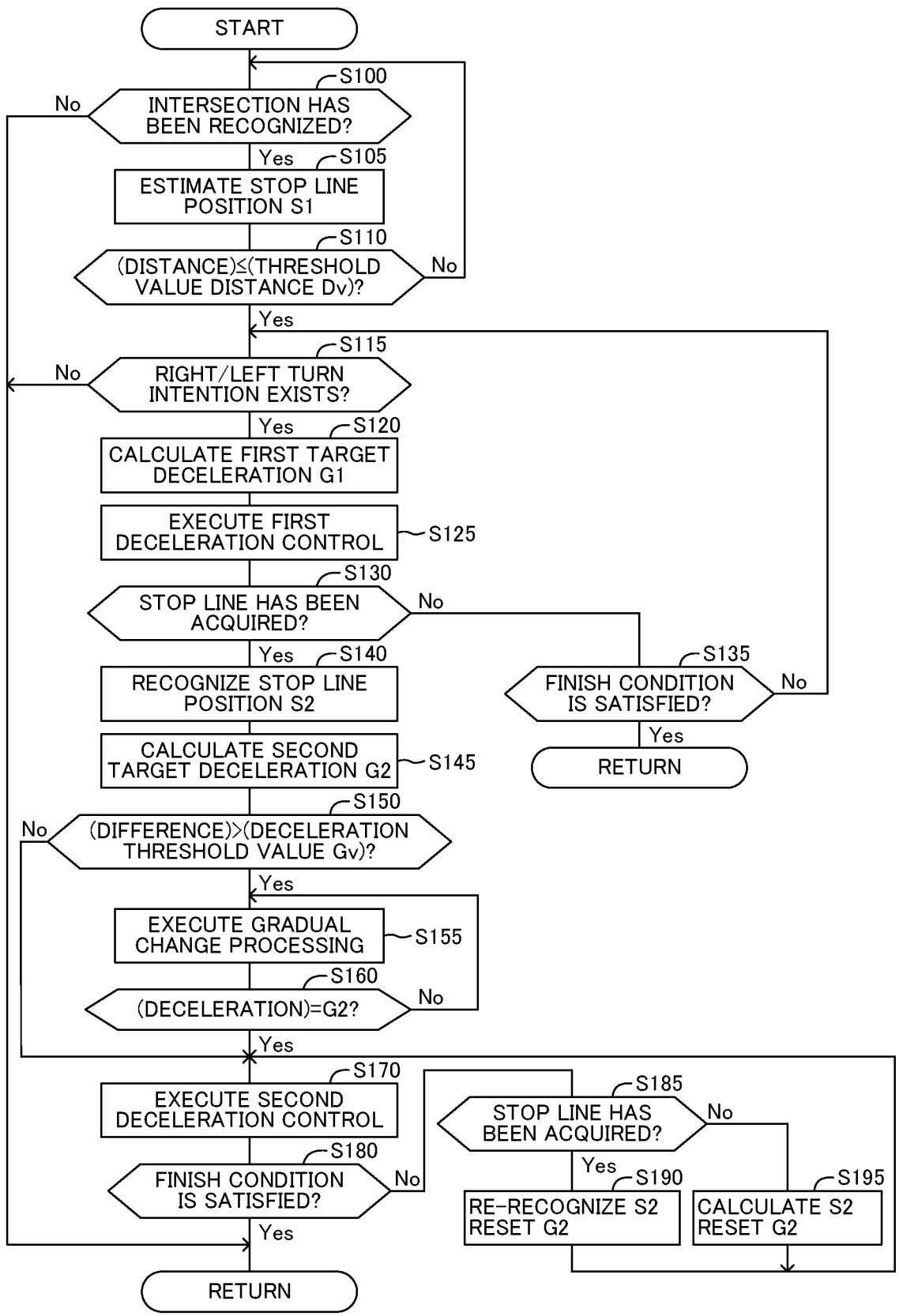
FIG. 9 is a flowchart for illustrating a routine of the deceleration assistance control in the at least one embodiment.

Next, referring to a flowchart of FIG. 9, description is now given of a routine of the deceleration assistance control executed by the ECU 10. This routine is started when the vehicle SV travels.

In Step S100, the ECU 10 determines whether or not an intersection is recognized in front of the vehicle SV based on the target information acquired by the target information acquisition device 30. When an intersection is recognized (Yes), the ECU 10 advances the process to Step S105. Meanwhile, when an intersection is not recognized (No), the ECU 10 temporarily finishes this routine (returns).

In Step S105, the ECU 10 estimates a stop line of the intersection based on the recognized position of the intersection. Specifically, the ECU 10 estimates, as the estimated stop line position S1, the position on the vehicle SV side apart from the recognized position of the intersection by the distance "d." When the estimated stop line position S1 is estimated, the ECU 10 advances the process to Step S110.

In Step S110, it is determined whether or not the distance between the vehicle SV and the intersection has become equal to or shorter than the predetermined threshold value distance Dv. When the distance between the vehicle SV and the intersection has become equal to or shorter than the threshold value distance Dv (Yes), the ECU 10 advances the process to Step S115. Meanwhile, when the distance between the vehicle SV and the intersection has not become equal to or shorter than the threshold value distance Dv (No), the ECU 10 returns the process to Step S100.

In Step S115, the ECU 10 determines whether or not the driver has the right/left turn intention. When the driver has the right/left turn intention (Yes), the ECU 10 advances the process to Step S120. Meanwhile, when the driver does not have the right/left turn intention (No), the ECU 10 temporarily finishes this routine (returns).

In Step S120, the ECU 10 calculates the first target deceleration G1 based on the vehicle speed V and the estimated stop line position S1 at the time when the driver is determined to have the right/left turn intention. After that, in Step S125, the ECU 10 executes the first deceleration control of decelerating the vehicle SV at the first target deceleration G1.

In Step S130, the ECU 10 determines whether or not the target information acquisition device 30 has acquired the stop line position of the intersection. When the target information acquisition device 30 has acquired the stop line position of the intersection (Yes), the ECU 10 advances the process to Step S140. Meanwhile, when the target information acquisition device 30 has not acquired the stop line position of the intersection (No), the ECU 10 advances the process to Step S135.

In Step S135, the ECU 10 determines whether or not the finish condition for the deceleration control that the vehicle speed V of the vehicle SV decreases to the target speed Vt is satisfied before the vehicle SV reaches the estimated stop line position S1. When the finish condition is satisfied (Yes), the ECU 10 temporarily finishes this routine (returns). Meanwhile, when the finish condition is not satisfied (No), the ECU 10 returns the process to Step S115.

When the process proceeds from Step S130 to Step S140, the ECU 10 recognizes, as the recognized stop line position S2, the position of the stop line acquired by the target information acquisition device 30. After that, in Step S145, the ECU 10 calculates the second target deceleration G2 based on the vehicle speed V and the recognized stop line position S2 at the time when the recognized stop line position S2 is recognized.

In Step S150, the ECU 10 determines whether or not a difference between the first target deceleration G1 and the second target deceleration G2 exceeds the predetermined deceleration threshold value Gv. When the difference exceeds the deceleration threshold value Gv (Yes), the ECU 10 advances the process to Step S155. Meanwhile, when the difference does not exceed the deceleration threshold value Gv (No), the ECU 10 advances the process to Step S170. That is, the second deceleration control is started without executing the gradual change processing.

In Step S155, the ECU 10 executes the gradual change processing. Specifically, when the second target deceleration G2 (absolute value) is set to a higher deceleration than the first target deceleration G1 (absolute value), the ECU 10 executes the gradual change processing of gradually reducing the target deceleration from the first target deceleration G1 toward the second target deceleration G2 based on the change gradient GS set in advance (see FIG. 5). Meanwhile, when the second target deceleration G2 (absolute value) is set to a lower deceleration than the first target deceleration G1 (absolute value), the ECU 10 executes the gradual change processing of gradually increasing the target deceleration from the first target deceleration G1 toward the second target deceleration G2 based on the change gradient GS set in advance (see FIG. 6). While the target deceleration is gradually increased or reduced through the gradual change processing, the ECU 10 decelerates the vehicle SV based on the increasing or decreasing target deceleration.

In Step S160, the ECU 10 determines whether or not the deceleration of the vehicle SV matches the second target deceleration G2 as a result of the gradual change processing. When the target deceleration matches the second target deceleration G2 (Yes), the ECU 10 finishes the gradual change processing, and advances the process to Step S170. Meanwhile, when the deceleration does not match the second target deceleration G2 (No), the ECU 10 returns the process to Step S155. That is, the gradual change processing is continued.

In Step S170, the ECU 10 executes the second deceleration control of decelerating the vehicle SV at the second target deceleration G2. After that, in Step S180, the ECU 10 determines whether or not the finish condition for the deceleration control that the vehicle speed V of the vehicle SV decreases to the target speed Vt is satisfied before the vehicle SV reaches the recognized stop line position S2. When the finish condition is satisfied (Yes), the ECU 10 temporarily finishes this routine (returns). Meanwhile, when the finish condition is not satisfied (No), the ECU 10 advances the process to Step S185.

In Step S185, the ECU 10 determines whether or not the target information acquisition device 30 can acquire the position of the stop line. When the target information acquisition device 30 can acquire the position of the stop line (Yes), the ECU 10 advances the process to Step S190. In Step S190, the ECU 10 sets the position of the stop line acquired by the target information acquisition device 30 as a new recognized stop line position S2, and resets the second target deceleration G2 based on the vehicle speed V at this time and the recognized stop line position S2 newly recognized. When the second target deceleration G2 is reset, the ECU 10 advances the process to Step S170, and continues the second deceleration control based on the reset target deceleration G2.

In Step S185, when it is determined that a state in which the target information acquisition device 30 cannot acquire the position of the stop line occurs (No), the ECU 10 advances the process to Step S195. In Step S195, the ECU 10 resets a new second target deceleration G2 based on the vehicle speed V at this time and the current relative position of the stop line calculated from the recognized stop line position S2 recognized in Step S140 and the position change amount of the vehicle SV. When the second target deceleration G2 is reset, the ECU 10 advances the process to Step S170, and continues the second deceleration control based on the reset target deceleration G2. That is, there is provided such a configuration that, when the state in which the target information acquisition device 30 cannot acquire the stop line occurs due to existence of a preceding vehicle or the like, the second deceleration control can be continued based on the recognized stop line position S2 recognized in Step S140. As a result, even when the state in which the target information acquisition device 30 cannot acquire the stop line occurs after the start of the second deceleration control, the vehicle SV can reliably be decelerated to the target speed Vt.

The ECU 10 subsequently repeats the above-mentioned processing steps from Step S100 to Step S195 until the traveling vehicle SV stops.

According to the at least one embodiment described above in detail, when the position of the intersection is acquired before the target information acquisition device 30 acquires the stop line, the ECU 10 estimates the estimated stop line position S1 based on the acquired position of the intersection, and executes the first deceleration control of decelerating the vehicle SV at the predetermined first target deceleration G1 when the driver has the right/left turn intention. As a result, the deceleration control can be started at a timing closer to the sense of the driver, thereby being capable of reliably reducing the uncomfortable feeling of the driver compared with the case in which the deceleration control is executed from the time at which the target information acquisition device 30 acquires the stop line.

Moreover, when the target information acquisition device 30 acquires the position of the stop line after the first deceleration control is started, the ECU 10 sets the acquired position of the stop line as the recognized stop line position S2, and executes the second deceleration control of decelerating the vehicle SV at the predetermined second target deceleration G2. At this time, when the difference between the first target deceleration G1 and the second target deceleration G2 exceeds the predetermined deceleration threshold value Gv, the ECU 10 executes the gradual change processing of gradually changing the target deceleration from the first target deceleration G1 toward the second target deceleration G2 based on the change gradient GS set in advance. As a result, it is possible to effectively prevent the great sudden change in the deceleration of the vehicle SV to suppress the behavior change of the vehicle, thereby being capable of reliably preventing the deterioration of the drivability.

In the above, the deceleration assistance device, the vehicle, the deceleration assistance method, and the program according to the at least one embodiment have been described, but the present disclosure is not limited to the above-mentioned at least one embodiment, and various changes are possible within the range not departing from the object of the present disclosure.

Modification Example 1

For example, the change gradient GS to be used for the gradual change processing is not limited to a uniform value (fixed value), and may be a variable value corresponding to a difference between the actual deceleration GA (or the first target deceleration G1) of the vehicle SV and the second target deceleration G2 at the time when the execution condition for the gradual change processing is satisfied.

Figure 10:
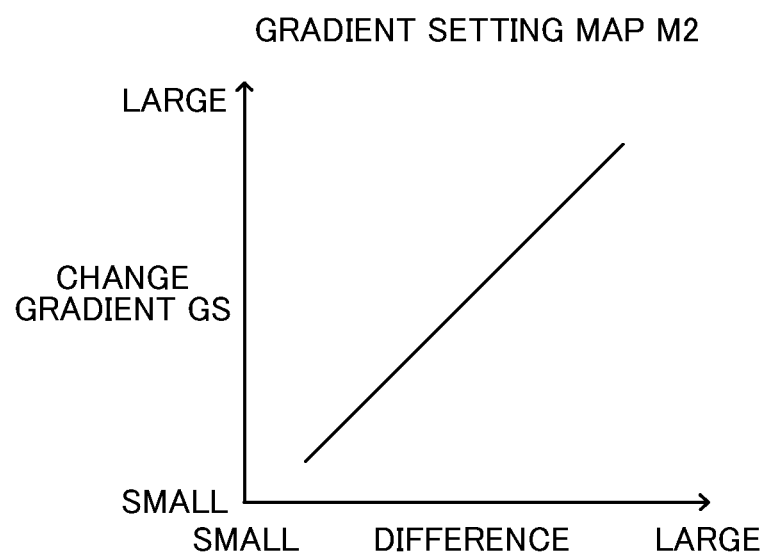
FIG. 10 is a schematic graph for showing an example of a gradient setting map in Modification Example 1 of the present disclosure.

FIG. 10 is a schematic graph for showing an example of a gradient setting map M2 to be used in Modification Example 1. The gradient setting map M2 is a map referred to based on the difference between the actual deceleration GA (or the first target deceleration G1) of the vehicle SV and the second target deceleration G2, and is stored in advance in the ROM of the ECU 10. In the gradient setting map M2, the change gradient GS (change rate of the deceleration per unit time) is set to a larger value as the difference increases. The gradual change processing unit 17 refers to the gradient setting map M2 based on the difference between the actual deceleration GA (or the first target deceleration G1) and the second target deceleration G2 at the time when the execution condition for the gradual change processing is satisfied, to thereby set the change gradient GS corresponding to the difference, and executes the gradual change processing based on the set change gradient GS.

Figure 11:
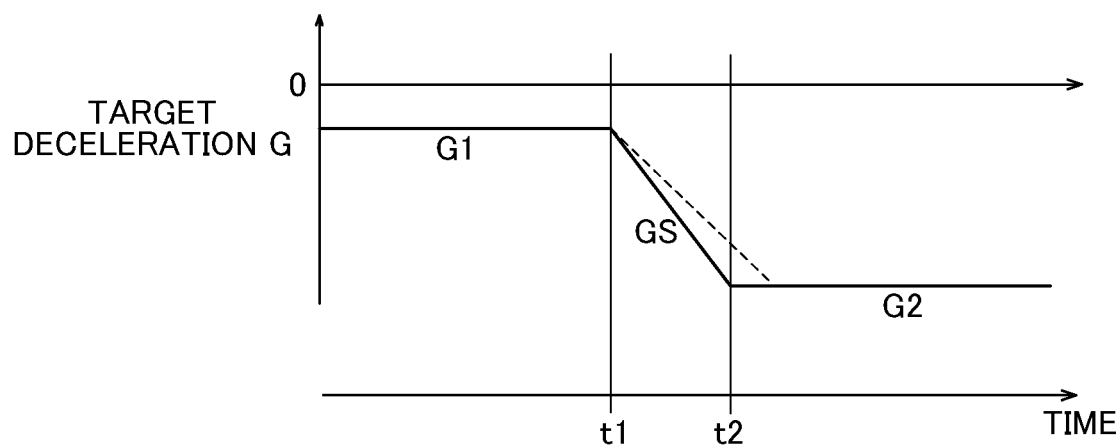
FIG. 11 is a schematic graph for showing deceleration assistance control in Modification Example 1.
Figure 12:
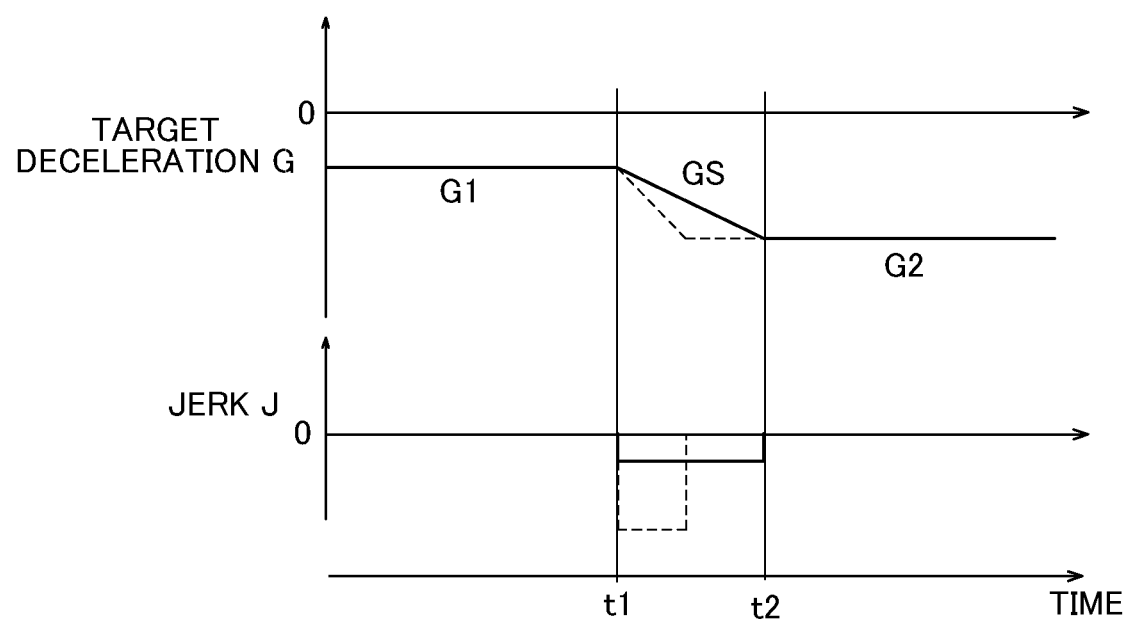
FIG. 12 is a schematic graph for showing the deceleration assistance control in Modification Example 1.

That is, as shown in FIG. 11, when the difference between the actual deceleration GA (the first target deceleration G1 in the shown example) and the second target deceleration G2 is large, the change gradient GS is set to a relatively large value. Meanwhile, as shown in FIG. 12, when the difference between the actual deceleration GA (the first target deceleration G1 in the shown example) and the second target deceleration G2 is small, the change gradient GS is set to a relatively small value.

As described above, by setting the change gradient GS of the target deceleration to the variable value corresponding to the difference between the actual deceleration GA (or the first target deceleration G1) and the second target deceleration G2, when the difference is large, the target deceleration is gradually changed toward the second target deceleration G2 at a large change gradient GS. It is consequently possible to effectively prevent the gradual change period from t1 to t2 from increasing compared with the case in which the change gradient GS is set to a uniform fixed value (broken line of the graph). Moreover, when the difference between the actual deceleration GA (or the first target deceleration G1) and the second target deceleration G2 is small, the target deceleration is gradually changed toward the second target deceleration G2 at a small change gradient GS. It is consequently possible to effectively prevent the jerk J of the vehicle SV from excessively increasing compared with the case in which the change gradient GS is set to the uniform fixed value (broken line of the graph).

Modification Example 2

The change gradient GS to be used for the gradual change processing may be a variable value corresponding to a lighting color of the signal of the intersection. It is only required to recognize the lighting color of the signal through machine learning such as pattern matching based on image data of the signal of the intersection captured by the camera 31.

Figure 13:
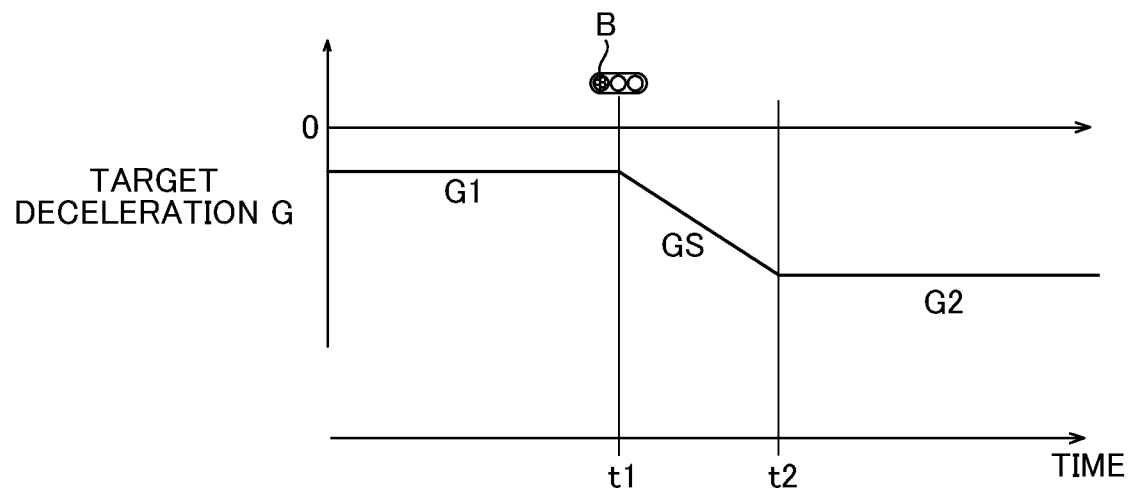
FIG. 13 is a schematic graph for showing deceleration assistance control in Modification Example 2 of the present disclosure.
Figure 14:
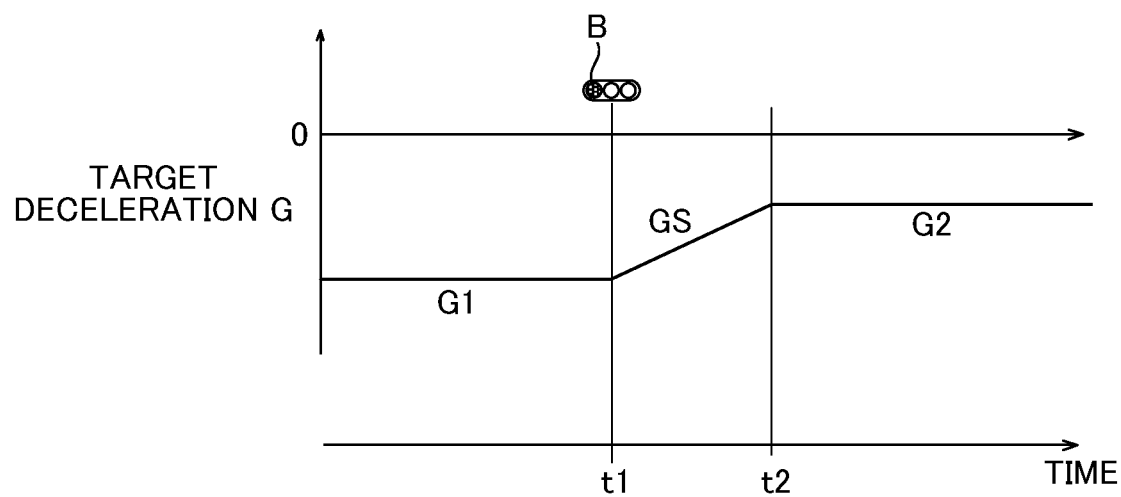
FIG. 14 is a schematic graph for showing the deceleration assistance control in Modification Example 2.

For example, as shown in FIG. 13 and FIG. 14, when the camera 31 recognizes that the lighting color of the signal is "green B" or an "arrow" permitting the right or left turn at the time t1 at which the execution condition for the gradual change processing is satisfied, the gradual change processing unit 17 executes the gradual change processing based on the change gradient GS set in advance.

Figure 15:
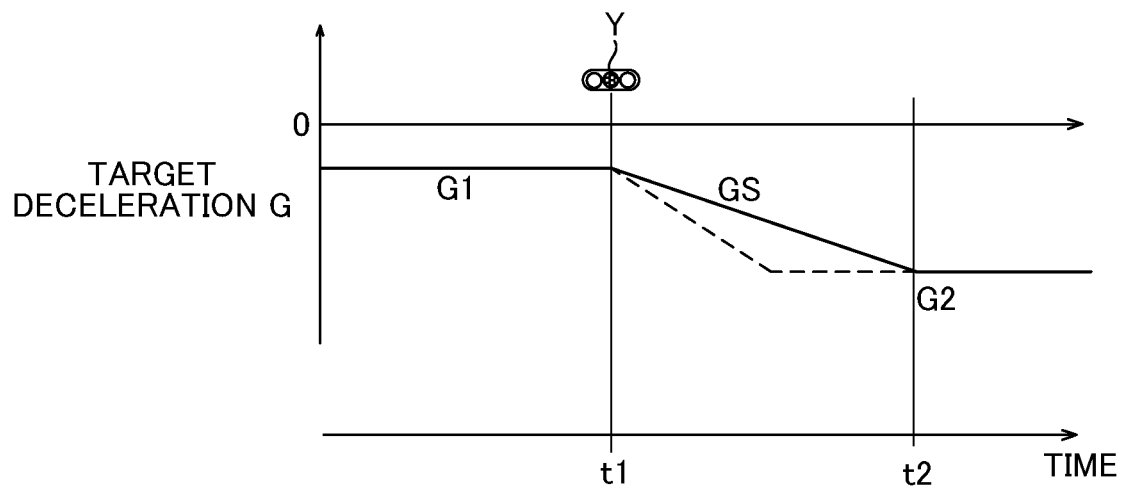
FIG. 15 is a schematic graph for showing the deceleration assistance control in Modification Example 2.
Figure 16:
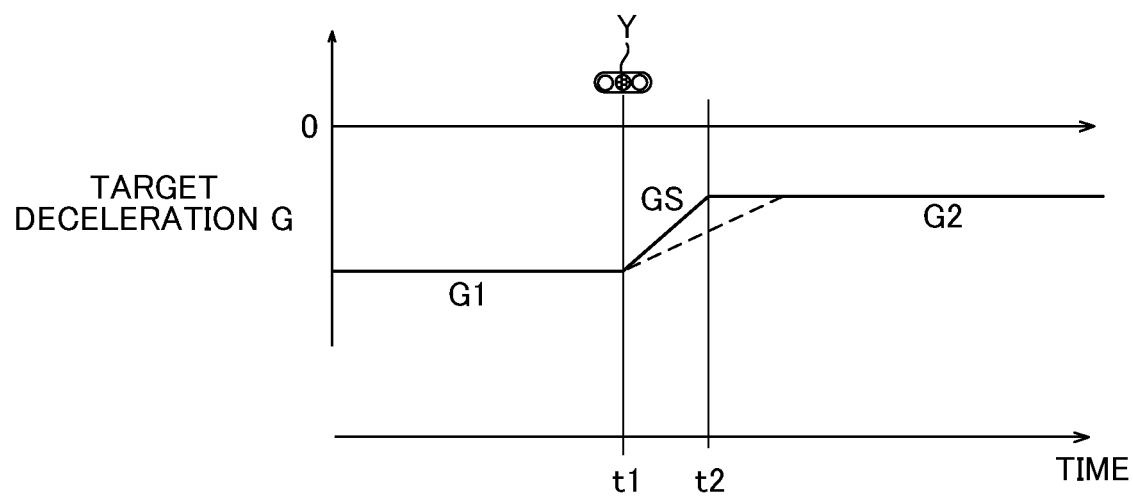
FIG. 16 is a schematic graph for showing the deceleration assistance control in Modification Example 2.

Meanwhile, as shown in FIG. 15 and FIG. 16, when the camera 31 recognizes that the lighting color of the signal is "yellow Y" at the time t1 at which the execution condition for the gradual change processing is satisfied, and (1) it is determined that the vehicle SV is traveling at a vehicle speed V at which the vehicle SV cannot safely stop before the vehicle SV reaches the recognized stop line position S2, or (2) it is determined that the distance between the vehicle SV and the stop line and the vehicle speed V are in a state in which the vehicle SV can turn right or left at the intersection without stopping at the stop line based on big data including right and left turn timings at intersections collected from a large number of vehicles, the gradual change processing unit 17 sets the change gradient GS so that the vehicle SV does not greatly decelerate before the vehicle SV reaches the recognized stop line position S2.

Specifically, as shown in FIG. 15, when the absolute value of the second target deceleration G2 is larger than the absolute value of the first target deceleration G1, the gradual change processing unit 17 sets the change gradient GS (change rate of the deceleration per unit time) to a smaller value compared with a case in which the lighting color of the signal is the "green" or the "arrow" (see the broken line). Meanwhile, as shown in FIG. 16, when the absolute value of the second target deceleration G2 is smaller than the absolute value of the first target deceleration G1, the gradual change processing unit 17 sets the change gradient GS (change rate of the deceleration per unit time) to a larger value compared with the case in which the lighting color of the signal is the "green" or the "arrow" (see the broken line).

As described above, under the state in which the lighting color of the signal is the "yellow Y," and it is appropriate for the vehicle SV to turn right or left without stopping at the intersection, the increase in the deceleration is delayed when the second target deceleration G2 is higher than the first target deceleration G1, and the decrease in the deceleration is sped up when the second target deceleration G2 is lower than the first target deceleration G1, thereby being capable of preventing the vehicle SV from greatly decelerating before the vehicle SV reaches the stop line. As a result, it is possible to effectively assist the driver in making smooth right and left turns. Moreover, it is also possible to prevent a rear end collision of a following vehicle caused by the sudden deceleration of the vehicle SV, thereby being capable of increasing safety as well.

Although a detailed description is omitted, when the camera 31 recognizes that the lighting color of the signal is "red" at the time t1 at which the execution condition for the gradual change processing is satisfied, it is only required for the deceleration control unit 16 to execute the deceleration control so that the vehicle SV stops at the position of the recognized stop line S2 or a position before the recognized stop line S2.

Others

In the above description of the present disclosure, the deceleration control is executed when the driver has the right/left turn intention. However, there may be provided such a configuration that, even when the driver does not have the right/left turn intention, the deceleration control is executed in a case in which a stop line, a crosswalk without a signal, or an obstacle with which the vehicle SV is highly likely to collide, such as a preceding vehicle, a human, or a bicycle, is detected as the deceleration object in front of the vehicle SV. In this case, the target speed Vt may be set to, for example, 0 (zero).

What is claimed is:

1. A deceleration assistance device for executing deceleration control of automatically decelerating a traveling vehicle based on a deceleration object in front of the vehicle, the deceleration assistance device comprising:

a target information acquisition unit configured to acquire target information relating to a target in front of the vehicle;

a position estimation unit configured to estimate an estimated position of the deceleration object based on target information relating to a target other than the deceleration object and being acquired by the target information acquisition unit before the target information acquisition unit acquires target information relating to the deceleration object as the target;

a position recognition unit configured to recognize, when the target information acquisition unit acquires a position of the deceleration object as the target information, the acquired position as a recognized position of the deceleration object; and a control unit configured to execute, based on the estimated position, first deceleration control of decelerating the vehicle at one of a constant first deceleration or a variable first deceleration, and to execute, based on the recognized position, second deceleration control of decelerating the vehicle at one of a constant second deceleration or a variable second deceleration, wherein the control unit is configured to execute gradual change processing of gradually changing a deceleration of the vehicle from a first deceleration comprising one of a constant first deceleration or a variable first deceleration toward a second deceleration comprising one of a constant second deceleration or a variable second deceleration when the deceleration control is caused to transition from the first deceleration control to the second deceleration control, and when a difference exists between the first deceleration and the second deceleration, wherein the deceleration object is a stop line of an intersection equipped with a signal, which is positioned in front of the vehicle, wherein the target information acquisition unit is configured to recognize a lighting state of the signal, and wherein, in a case in which the deceleration control is caused to transition from the first deceleration control to the second deceleration control, and the target information acquisition unit recognizes that the lighting state of the signal is yellow, the control unit is configured to:

set a change rate of the deceleration per unit time during the execution of the gradual change processing to a smaller change rate than the change rate at a time when the target information acquisition unit recognizes the lighting state of the signal as one of green or an arrow which indicates that passage is permitted, when an absolute value of the second deceleration is larger than an absolute value of the first deceleration; and set the change rate of the deceleration per unit time during the execution of the gradual change processing to a larger change rate than the change rate at the time when the target information acquisition unit recognizes the lighting state of the signal as one of the green or the arrow which indicates that the passage is permitted, when the absolute value of the second deceleration is smaller than the absolute value of the first deceleration.

2. The deceleration assistance device according to claim 1, wherein the control unit is configured to execute the gradual change processing at a change rate of the deceleration per unit time different from a change rate during the execution of the first deceleration control and a change rate during the execution of the second deceleration control.

3. The deceleration assistance device according to claim 1, wherein, when the deceleration control is caused to transition from a first deceleration comprising one of a constant first deceleration or a variable first deceleration control to a second deceleration comprising one of a constant second deceleration or a variable second deceleration control, the control unit is configured to set a larger change rate of the deceleration per unit time during the execution of the gradual change processing as the difference between the first deceleration and the second deceleration becomes larger, and to set a smaller change rate of the deceleration per unit time during the execution of the gradual change processing as the difference between the first deceleration and the second deceleration becomes smaller.

4. The deceleration assistance device according to claim 1,
wherein the deceleration object is a stop line of an intersection positioned in front of the vehicle, and
wherein the control unit is configured to execute, when the vehicle is predicted to make one of a right turn or a left turn at the intersection, the deceleration control so that the vehicle decelerates to a predetermined target speed appropriate for one of the right turn or the left turn before the vehicle reaches the stop line.

5. The deceleration assistance device according to claim 1, wherein the control unit is configured to:
determine, during the execution of the deceleration control, whether a finish condition that a speed of the vehicle decreases to a predetermined target speed is satisfied before the vehicle reaches the recognized position; and
continue, when the finish condition is determined not to be satisfied, the deceleration control at a deceleration set based on a speed of the vehicle at a time when the finish condition is determined not to be satisfied and the recognized position of the deceleration object recognized by the position recognition unit.

6. The deceleration assistance device according to claim 1, wherein the control unit is configured to continue the second deceleration control based on the recognized position recognized by the position recognition unit when the target information acquisition unit is brought into a state in which the position of the deceleration object fails to be acquired during the execution of the second deceleration control.

7. A vehicle, comprising the deceleration assistance device of claim 1 mounted thereon.

8. The deceleration assistance device according to claim 2, wherein, when the deceleration control is caused to transition from the first deceleration control to the second deceleration control, the control unit is configured to set a larger change rate of the deceleration per unit time during the execution of the gradual change processing as the difference between the first deceleration and the second deceleration becomes larger, and to set a smaller change rate of the deceleration per unit time during the execution of the gradual change processing as the difference between the first deceleration and the second deceleration becomes smaller.

9. The deceleration assistance device according to claim 2,
wherein the deceleration object is a stop line of an intersection positioned in front of the vehicle, and
wherein the control unit is configured to execute, when the vehicle is predicted to make one of a right turn or a left turn at the intersection, the deceleration control so that the vehicle decelerates to a predetermined target speed appropriate for one of the right turn or the left turn before the vehicle reaches the stop line.

10. The deceleration assistance device according to claim 2,
wherein the control unit is configured to:
determine, during the execution of the deceleration control, whether a finish condition that a speed of the vehicle decreases to a predetermined target speed is satisfied before the vehicle reaches the recognized position; and
continue, when the finish condition is determined not to be satisfied, the deceleration control at a deceleration set based on a speed of the vehicle at a time when the finish condition is determined not to be satisfied and the recognized position of the deceleration object recognized by the position recognition unit.

11. The deceleration assistance device according to claim 2, wherein the control unit is configured to continue the second deceleration control based on the recognized position recognized by the position recognition unit when the target information acquisition unit is brought into a state in which the position of the deceleration object fails to be acquired during the execution of the second deceleration control.

12. A vehicle, comprising the deceleration assistance device of claim 2, mounted thereon.

13. A deceleration assistance method for executing deceleration control of automatically decelerating a traveling vehicle based on a deceleration object in front of the vehicle, the deceleration assistance method comprising:
estimating an estimated position of the deceleration object based on target information relating to a target other than the deceleration object, the target information being acquired as target information relating to a target in front of the vehicle before acquiring target information relating to the deceleration object;
recognizing, when a position of the deceleration object is acquired as the target information, the acquired position as a recognized position of the deceleration object;
executing, based on the estimated position, first deceleration control of decelerating the vehicle at a first deceleration comprising one of a constant first deceleration or a variable first deceleration, and executing, based on the recognized position, second deceleration control of decelerating the vehicle at a second deceleration comprising one of a constant second deceleration or a variable second deceleration; and
executing gradual change processing of gradually changing a deceleration of the vehicle from the first deceleration toward the second deceleration when the deceleration control is caused to transition from the first deceleration control to the second deceleration control, and when a difference exists between the first deceleration and the second deceleration, wherein the deceleration object is a stop line of an intersection equipped with a signal, which is positioned in front of the vehicle, recognizing from the target information a lighting state of the signal, and wherein, in a case in which the deceleration control is caused to transition from the first deceleration control to the second deceleration control, and the lighting state of the signal is recognized as yellow:

set a change rate of the deceleration per unit time during the execution of the gradual change processing to a smaller change rate than the change rate at a time when the recognized lighting state of the signal is one of a green or an arrow which indicates that passage is permitted, when an absolute value of the second deceleration is larger than an absolute value of the first deceleration; and set the change rate of the deceleration per unit time during the execution of the gradual change processing to a larger change rate than the change rate at the time when the recognized lighting state of the signal is one of the green or the arrow which indicates that the passage is permitted, when the absolute value of the second deceleration is smaller than the absolute value of the first deceleration.

14. A non-transitory computer readable storage medium for storing a program for causing a computer of a deceleration assistance device for executing deceleration control of automatically decelerating a traveling vehicle based on a deceleration object in front of the vehicle to execute the processes of:

estimating an estimated position of the deceleration object based on target information relating to a target other than the deceleration object, the target information being acquired as target information relating to a target in front of the vehicle before acquiring target information relating to the deceleration object;

recognizing, when a position of the deceleration object is acquired as the target information, the acquired position as a recognized position of the deceleration object;

executing, based on the estimated position, first deceleration control of decelerating the vehicle at a first deceleration comprising one of a constant first deceleration or a variable first deceleration, and executing, based on the recognized position, second deceleration control of decelerating the vehicle at a second deceleration comprising one of a constant second deceleration or a variable second deceleration; and executing gradual change processing of gradually changing a deceleration of the vehicle from the first deceleration toward the second deceleration when the deceleration control is caused to transition from the first deceleration control to the second deceleration control, and when a difference exists between the first deceleration and the second deceleration, wherein the deceleration object is a stop line of an intersection equipped with a signal, which is positioned in front of the vehicle, recognizing from the target information a lighting state of the signal, and wherein, in a case in which the deceleration control is caused to transition from the first deceleration control to the second deceleration control, and the lighting state of the signal is recognized as yellow:

set a change rate of the deceleration per unit time during the execution of the gradual change processing to a smaller change rate than the change rate at a time when the recognized lighting state of the signal is one of a green or an arrow which indicates that passage is permitted, when an absolute value of the second deceleration is larger than an absolute value of the first deceleration; and set the change rate of the deceleration per unit time during the execution of the gradual change processing to a larger change rate than the change rate at the time when the recognized lighting state of the signal is one of the green or the arrow which indicates that the passage is permitted, when the absolute value of the second deceleration is smaller than the absolute value of the first deceleration.

\* \* \* \* \*